US012547064B2

United States Patent
Miura et al.

(10) Patent No.: US 12,547,064 B2
(45) Date of Patent: Feb. 10, 2026

(54) SCREEN, IMAGE PROJECTION SYSTEM, AND VEHICLE

(71) Applicant: SONY GROUP CORPORATION, Tokyo (JP)

(72) Inventors: Koji Miura, Tokyo (JP); Shogo Kubota, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 228 days.

(21) Appl. No.: 18/546,969

(22) PCT Filed: Jan. 26, 2022

(86) PCT No.: PCT/JP2022/002843
§ 371 (c)(1),
(2) Date: Aug. 17, 2023

(87) PCT Pub. No.: WO2022/181166
PCT Pub. Date: Sep. 1, 2022

(65) Prior Publication Data
US 2024/0310713 A1    Sep. 19, 2024

(30) Foreign Application Priority Data

Feb. 25, 2021 (JP) .................. 2021-028073

(51) Int. Cl.
*G03B 21/604* (2014.01)
*G03B 21/60* (2014.01)
(Continued)

(52) U.S. Cl.
CPC .......... *G03B 21/604* (2013.01); *G03B 21/60* (2013.01); *G03B 21/62* (2013.01); *B60R 1/001* (2013.01)

(58) Field of Classification Search
CPC ...... G03B 21/604; G03B 21/62; G03B 21/60; B60R 1/001
(Continued)

(56) References Cited

U.S. PATENT DOCUMENTS

| 12,108,195 B2 * | 10/2024 | Goto | G02B 5/0236 |
| 2005/0057804 A1 * | 3/2005 | Umeya | G03B 21/625 |
| | | | 359/449 |

(Continued)

FOREIGN PATENT DOCUMENTS

| EP | 3272568 A1 | 1/2018 |
| JP | 06-301005 A | 10/1994 |

(Continued)

OTHER PUBLICATIONS

International Search Report and Written Opinion of PCT Application No. PCT/JP2022/002843, issued on Apr. 12, 2022, 11 pages of ISRWO.

*Primary Examiner* — Christopher E Mahoney
(74) *Attorney, Agent, or Firm* — CHIP LAW GROUP

(57) ABSTRACT

There is provided a screen that displays an image in accordance with emission of image light including light in a predetermined polarized state as a major component and includes a corrugated surface and an optical element unit. The corrugated surface includes a plurality of reflection surfaces, the plurality of reflection surfaces having light transmissivity and diffusing and reflecting the emitted image light. The optical element unit is configured in accordance with a polarized state of the image light on a second side opposite to a first side of the corrugated surface on which the image light is emitted, restricts transmission of the image light to the second side, and transmits at least part of light entering from the second side.

17 Claims, 22 Drawing Sheets

(51) Int. Cl.
*G03B 21/62* (2014.01)
*B60R 1/00* (2022.01)

(58) Field of Classification Search
USPC .......................................................... 359/451
See application file for complete search history.

(56) References Cited

U.S. PATENT DOCUMENTS

| | | | |
|---|---|---|---|
| 2007/0153236 A1 | 7/2007 | Quach | |
| 2017/0255022 A1 | 9/2017 | Duffy | |
| 2017/0269360 A1* | 9/2017 | Yamaguchi | G02B 27/0101 |
| 2017/0307892 A1* | 10/2017 | Freeman | G02C 7/12 |
| 2024/0036429 A1* | 2/2024 | Chen | G03B 21/56 |

FOREIGN PATENT DOCUMENTS

| | | | | |
|---|---|---|---|---|
| JP | 2001-255586 A | 9/2001 | | |
| JP | 2004-102204 A | 4/2004 | | |
| JP | 2017-138555 A | 8/2017 | | |
| JP | 2018-146666 A | 9/2018 | | |
| WO | WO-2015186506 A1 * | 12/2015 | | G02B 5/30 |
| WO | 2017/150408 A1 | 9/2017 | | |

* cited by examiner

SCREEN, IMAGE PROJECTION SYSTEM, AND VEHICLE

CROSS REFERENCE TO RELATED APPLICATIONS

This application is a U.S. National Phase of International Patent Application No. PCT/JP2022/002843 filed on Jan. 26, 2022, which claims priority benefit of Japanese Patent Application No. JP 2021-028073 filed in the Japan Patent Office on Feb. 25, 2021. Each of the above-referenced applications is hereby incorporated herein by reference in its entirety.

TECHNICAL FIELD

The present technology relates to a screen, an image projection system, and a vehicle.

BACKGROUND ART

Patent Literature 1 has described a projection observation apparatus that is mounted on a dashboard of an automobile and simultaneously displays different videos, e.g., a navigation video for a driver and a TV video for a passenger to both the driver and the passenger seated on a front passenger sheet so that they can observe the videos (paragraph in specification, FIG. 39, etc. of Patent Literature 1).

CITATION LIST

Patent Literature

Patent Literature 1: Japanese Patent Application Laid-open No. 2004-102204

DISCLOSURE OF INVENTION

Technical Problem

For example, in a case of viewing images in a vehicle or the like as described above, it is desirable to provide a technology capable of achieving a favorable viewing environment to the viewer.

In view of the above-mentioned circumstances, it is an object of the present technology to provide a screen, an image projection system, and a vehicle that can achieve a favorable viewing environment.

Solution to Problem

In order to accomplish the above-mentioned object, a screen according to an embodiment of the present technology is a screen that displays an image in accordance with emission of image light including light in a predetermined polarized state as a major component and includes a corrugated surface and an optical element unit.

The corrugated surface includes a plurality of reflection surfaces, the plurality of reflection surfaces having light transmissivity and diffusing and reflecting the emitted image light.

The optical element unit is configured in accordance with a polarized state of the image light on a second side opposite to a first side of the corrugated surface on which the image light is emitted, restricts transmission of the image light to the second side, and transmits at least part of light entering from the second side.

With this screen, the plurality of reflection surfaces included in the corrugated surface diffuses and reflects the image light. This can display an image to a viewer present on the first side. Moreover, the optical element unit restricts transmission of the image light to the second side and transmits part of light entering from the second side. This screen can be thus used as the transparent screen. Moreover, leakage of the image light to the second side can be suppressed. A favorable viewing environment for the viewer is thus achieved.

The screen may display the image in accordance with emission of the image light including linearly polarized light, circularly polarized light, or elliptically polarized light as a major component.

The optical element unit may have a polarizing plate with a direction of a light shielding axis defined to be a predetermined direction.

The polarizing plate may have the direction of the light shielding axis defined using a vertical direction as a reference.

Provided that a plane including a normal line at a predetermined reference point on the screen and a vertical direction is a reference plane, the direction of the light shielding axis of the polarizing plate may be set to be a direction orthogonal to the normal line and parallel to the reference plane.

The screen may display the image in accordance with emission of the image light including linearly polarized light having the reference plane as an oscillation plane as a major component.

Provided that the polarizing plate is a first polarizing plate,
the optical element unit may include
a quarter wave plate that is disposed on the second side of the first polarizing plate and converts a linearly polarized light having a direction of a light shielding axis of the first polarizing plate as a polarization direction into circularly polarized light, and
a second polarizing plate that is disposed on the second side of the quarter wave plate and having a direction of a light shielding axis orthogonal to the direction of the light shielding axis of the first polarizing plate.

The optical element unit may have a half-wave plate that is disposed on the second side of the polarizing plate and converts linearly polarized light having the direction of the light shielding axis of the polarizing plate as a polarization direction into linearly polarized light having a direction orthogonal to the direction of the light shielding axis of the polarizing plate as a polarization direction.

The screen may display the image in accordance with emission of the image light including elliptically polarized light having a major axis direction parallel to the reference plane as a major component.

The screen may display the image in accordance with emission of the image light including circularly polarized light as a major component. In this case, the optical element unit may have a quarter wave plate that is disposed on the first side of the polarizing plate and converts circularly polarized light into linearly polarized light having the direction of the light shielding axis of the polarizing plate as a polarization direction.

The screen may display the image in accordance with emission of the image light including elliptically polarized light as a major component. In this case, the optical element unit may have a phase difference plate that is disposed on the first side of the polarizing plate and converts elliptically polarized light into linearly polarized light having the direction of the light shielding axis of the polarizing plate as a polarization direction.

Provided that a plane including a normal line at a predetermined reference point on the screen and a vertical direction is a reference plane, the direction of the light shielding axis of the polarizing plate may be set as a direction parallel to the normal line of the reference plane.

The predetermined reference point on the screen may be a point crossing an optical axis of the image light.

The plurality of reflection surfaces may be constituted by a material having light transmissivity and may be configured as a rough surface.

The plurality of reflection surfaces may be configured by disposing a light-diffusing material on a surface constituted by a material having light transmissivity.

Provided that a plane including a normal line at a predetermined reference point on the screen and a vertical direction is a reference plane, each of the plurality of reflection surfaces may be a plane and is configured not to be orthogonal to the reference plane.

Provided that a plane including a normal line at a predetermined reference point on the screen and a vertical direction is a reference plane, each of the plurality of reflection surfaces may be a curved surface and be configured so that a tangential plane at a portion crossing the reference plane is not orthogonal to the reference plane.

An image projection system according to an embodiment of the present technology includes an image projection apparatus that emits image light including light in a predetermined polarized state as a major component and the above-mentioned screen.

A vehicle according to an embodiment of the present technology includes an image projection apparatus that emits image light including light in a predetermined polarized state as a major component and the above-mentioned screen.

The vehicle may further include a window. In this case, the screen is configured to be at least a partial region of the window.

MODE (S) FOR CARRYING OUT THE INVENTION

Hereinafter, embodiments according to the present technology will be described with reference to the drawings.

[Basic Configuration of Image Projection System]

Figure 1:
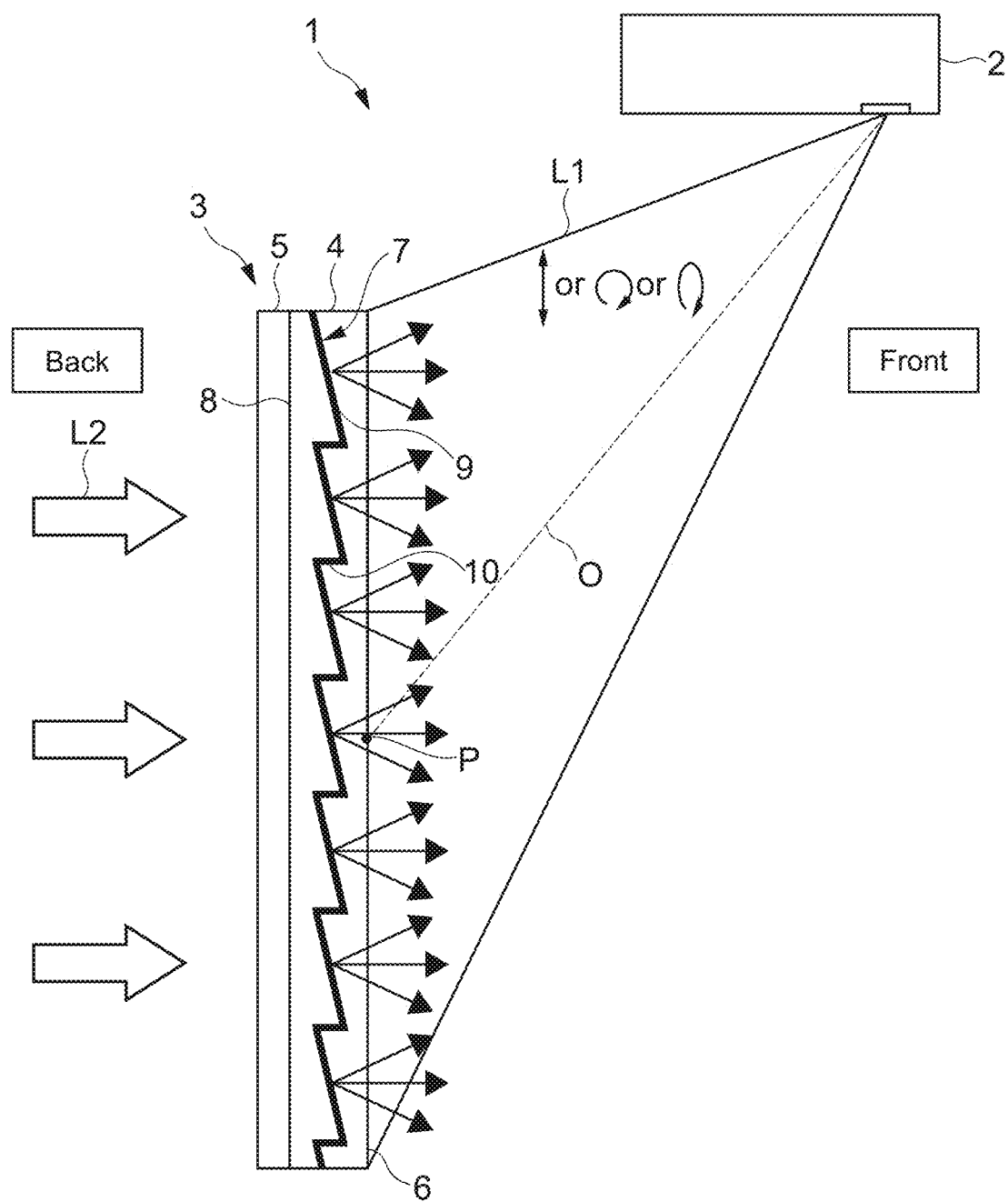
FIG. 1 A schematic view showing basic configurations of an image projection system according to an embodiment of the present technology.

FIG. 1 is a schematic view showing basic configurations of an image projection system according to an embodiment of the present technology.

In the present disclosure, an image includes both a still image and a moving image (video). The image projection system can also be referred to as a video projection system.

An image projection system 1 includes an image projection apparatus 2 and a screen 3.

The image projection apparatus 2 projects image light L1 constituting an image. In the present embodiment, the image light L1 including light in a predetermined polarized state as a major component is emitted. For example, light in a major polarized state as a result of observing a distribution of polarized states of light included in the image light L1 can be considered as the major component.

As shown in FIG. 1, for example, the image light L1 including linearly polarized light, circularly polarized light, or elliptically polarized light as a major component are emitted to the screen 3. Moreover, for example, the image light L1 including linearly polarized light having a predetermined plane as an oscillation plane as a major component or the image light L1 including linearly polarized light having a predetermined direction as a polarization direction (oscillation direction) as a major component is emitted. Otherwise, the present technology can be applied to the image light L1 including light in an arbitrary polarized state, which is not unpolarized light, as a major component.

For example, the image projection apparatus 2 can be a projector that spatially modulates light emitted from a light source to thereby form an optical image (image light L1) based on a video signal.

As shown in FIG. 1, in the present embodiment, a short throw projector is used as the image projection apparatus 2 (hereinafter, referred to as a short throw projector 2 using the same reference sign).

The short throw projector 2 is, for example, a projector for an ultra-wide angle where half the angle of view is 70 degrees or more. The short throw projector 2 can be called ultra-wide angle projector or ultra-short throw projector, for example.

Using the short throw projector 2 enables display of a large screen even in a small projection space. That is, magnified projection can be performed even in a case where the short throw projector 2 and the screen 3 are at a short distance. Thus, it has a high degree of freedom in selecting an installation place and it can be easily installed even in a narrow installation space or a ceiling with many obstacles, for example.

As a matter of course, a device other than the short throw projector may be used as the image projection apparatus 2.

The screen 3 displays an image by the short throw projector 2 emitting the image light L1. In the present embodiment, the screen 3 is designed in accordance with the polarized state of the image light L1.

As shown in FIG. 1, the screen 3 displays an image to a side to which the short throw projector 2 emits the image light L1. That is, the screen 3 diffuses and reflects the light from the short throw projector 2 in a direction of the short throw projector 2 disposed.

Moreover, the screen 3 has light transmissivity and can be used as a so-called transparent screen. It should be noted that in the present disclosure, "transparent" means not only "completely transparent" but also "semi-transparent" and "colored transparent".

Hereinafter, descriptions will be given assuming that the side of the screen 3 to which the image light L1 is emitted, i.e., the side on which the image is displayed is a front side and the opposite side is a back side. The front side corresponds to an embodiment of a first side according to the present technology and the back side corresponds to an embodiment of a second side according to the present technology.

As shown in FIG. 1, the screen 3 includes a screen unit 4 and an optical element unit 5.

The screen unit 4 functions to display an image to a user (viewer). The screen unit 4 has a screen surface 6, a corrugated surface 7, and a back surface 8.

The screen surface 6 is a top surface on the front side (display side). The screen surface 6 is typically constituted by a planar shape on the front side of the screen 3.

In the present embodiment, the corrugated surface 7 is configured inside the screen unit 4. The corrugated surface 7 achieves a minute directional angle control structure capable of directing the image light L1 of the short throw projector 2 in a certain direction. It should be noted that a configuration in which the corrugated surface 7 constitutes the top surface is also possible.

As shown in FIG. 1, the corrugated surface 7 has a plurality of reflection surfaces 9 and a plurality of connection surfaces 10. The reflection surfaces 9 and the connection surfaces 10 are disposed to be alternately arranged one by one. The reflection surface 9 and the connection surface 10 adjacent to each other constitute each groove and each ridge.

The plurality of reflection surfaces 9 has light transmissivity and diffuses and reflects the emitted image light L1. Thus, the viewer views the image light L1 diffused and reflected by each reflection surface 9 as an image.

Each of the plurality of reflection surfaces 9 is configured to be oriented in accordance with a predetermined image display direction. The predetermined image display direction is an orientation in which the image is wished to be displayed to the viewer. The predetermined image display direction can also be said to be a directional direction of the image light L1.

In the present embodiment, the orientation, shape, and the like of each reflection surface 9 are designed as appropriate, using a direction different from the front direction of the screen 3 as the image display direction. Thus, the orientation of the screen surface 6 and the orientation of each reflection surface 9 are designed to be different.

It should be noted that the plurality of reflection surfaces 9 may be formed in the same orientation. The present technology is not limited thereto, and the orientations of the plurality of reflection surfaces 9 may be configured to be different from each other so that each reflection surface 9 can display an image in a desired direction.

Moreover, the shape of each reflection surface 9 is also not limited, and a flat surface, a curved surface, or the like may be employed as appropriate. The plurality of reflection surfaces 9 may be configured in the same shape or may be configured in different shapes.

The width and pitch of the plurality of reflection surfaces 9 are designed by micrometers, for example. As a matter of course, the present technology is not limited to that size design.

Each connection surface 10 connects the reflection surfaces 9 adjacent to each other.

In the example shown in FIG. 1, the connection surface 10 is configured to be approximately parallel to a depth direction of the screen 3 as viewed from the front side. Then, the plurality of reflection surfaces 9 having substantially the same shape is configured to be arranged in upper and lower directions as viewed from the front side.

Therefore, the corrugated surface 7 is configured to have a sawtooth shape as the screen 3 is viewed from the side. As a matter of course, the present technology is not limited, and the orientation, shape, and the like of the plurality of connection surfaces 10 may be arbitrarily designed.

The back surface 8 is the top surface on the back side. The back surface 8 is typically configured to be a planar shape in parallel with the screen surface 6.

The optical element unit 5 is configured on a back side opposite to a side (i.e., front side) of the corrugated surface 7 to which the image light L1 is emitted. That is, the optical element unit 5 is connected to the back surface 8 of the screen unit 4.

The optical element unit 5 is configured in accordance with the polarized state of the image light L1 and restricts backward transmission of the image light L1. Moreover, the optical element unit 5 transmits at least part of background light L2 entering from the back side.

This can prevent the image light L1 from leaking behind the screen 3. Moreover, the viewer can visually recognize the background of the screen 3 and can use this screen 3 as the transparent screen.

In the present embodiment, it is assumed that a vertical direction is a Y direction and the screen 3 is disposed so that the plane direction of the screen surface 6 is parallel to the Y direction (vertical direction). Then, it is assumed that a normal line direction of the screen surface 6 is a Z direction and a direction orthogonal to each of the Y direction and the Z direction is an X direction. Thus, the Z direction is the front direction of the screen 3 and the X direction is a horizontal direction.

Moreover, using the viewer as a reference, the wordings, "upper side", "lower side", "left-hand side", "right-hand side", "front side", and "deep side" are sometimes used in the X direction (horizontal direction), the Y direction (vertical direction), and the Z direction (perpendicular direction).

In the example shown in FIG. 1, a side in the X direction indicated by the arrow is the right-hand side and the opposite side is a left-hand side. A side in the Y direction indicated by the arrow is the upper side and the opposite side is the lower side. A side in the Z direction indicated by the arrow is the front side and the opposite side is the deep side.

As a matter of course, the application of the present technology is not limited to such directional definitions.

[Arrangement Example of Short Throw Projector]

Figure 2A:
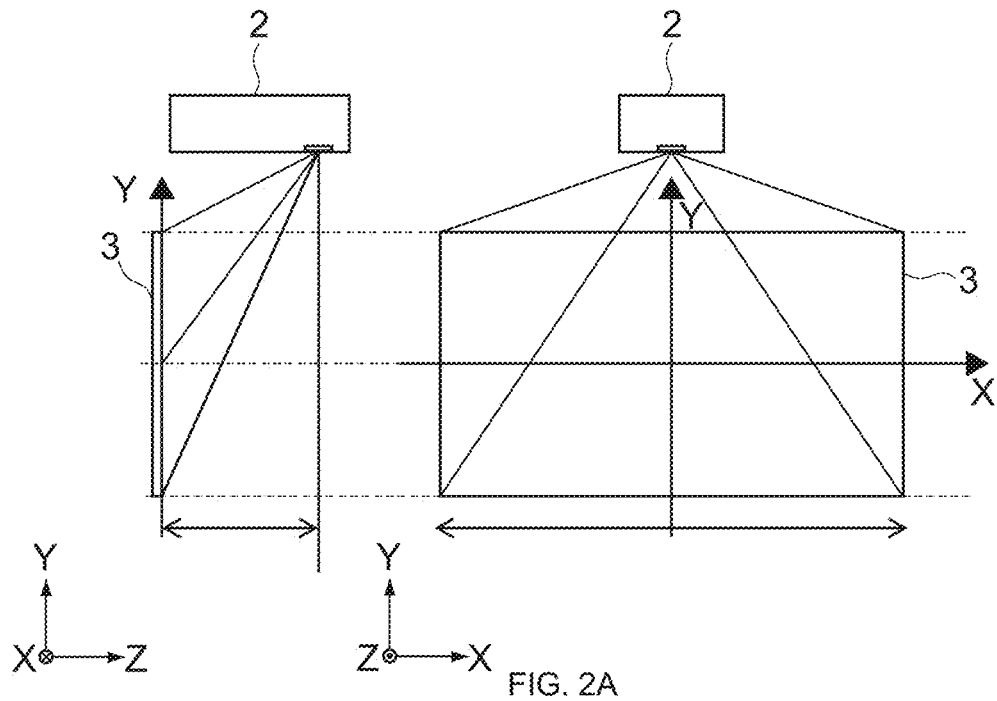
FIGS. 2A and 2B A schematic view showing an arrangement example of a short throw projector.
Figure 2B:
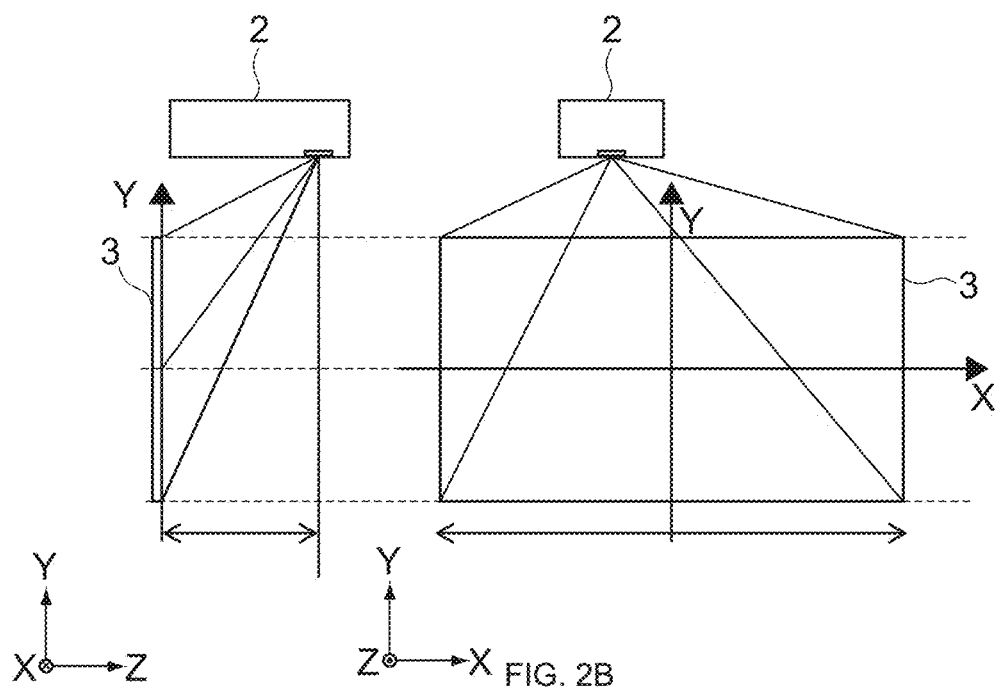

FIGS. 2A and 2B are schematic views showing an arrangement example of the short throw projector 2.

For example, as shown in FIG. 2A, the short throw projector 2 may be disposed at a position shifted upward in the Y direction (vertical direction) from the screen 3. Then, the image light L1 may be emitted obliquely downward from the upper side in the Y direction.

Alternatively, as shown in FIG. 2B, the short throw projector 2 may be disposed at a position shifted upward in the Y direction (vertical direction) and leftward in the X direction (horizontal direction) from the screen 3. Then, the image light L1 may be emitted obliquely downward from the upper side in the Y direction and rightward from the left-hand side in the X direction.

As a matter of course, the present technology is not limited to such an arrangement, and various arrangements may be employed.

For example, the short throw projector 2 has a throw ratio of 0.35 or less. Accordingly, the image projection system 1 can be easily configured even for a narrow space such as a vehicle interior space.

Since the short throw projector 2 can be arranged on a ceiling or the like of the vehicle, the image light L1 can be emitted to the screen 3 while avoiding the head and body of the viewer (vehicle passenger). A favorable viewing environment can be thus achieved.

Figure 3:
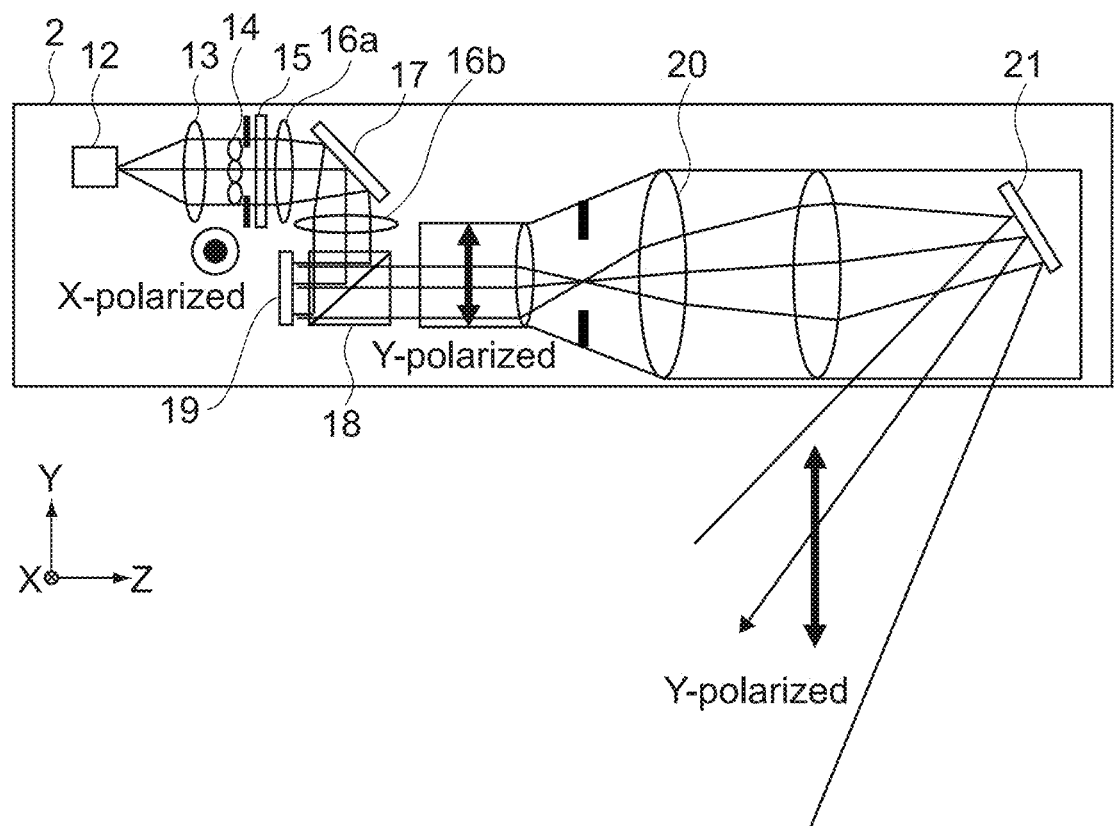
FIG. 3 A schematic view showing a configuration example of an optical system in the short throw projector.

FIG. 3 is a schematic view showing a configuration example of the optical system in the short throw projector 2.

Figure 4:
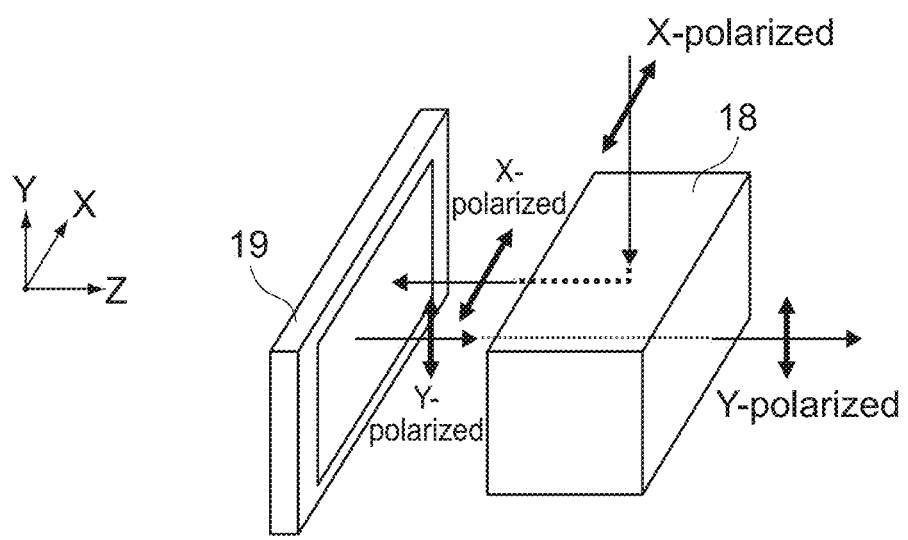
FIG. 4 A schematic view showing a part of the optical system shown in FIG. 3 in an enlarged state.

FIG. 4 is a schematic view showing a part of the optical system shown in FIG. 3 in an enlarged state.

FIGS. 3 and 4 show a configuration example in a case where the image light L1 including linearly polarized light having a plane parallel to a YZ plane as an oscillation plane as a major component is emitted.

The short throw projector 2 includes a light source unit 12, a collimator lens 13, a fly eye lens 14, a polarization conversion element 15, condenser lenses 16a and 16b, and a reflection mirror 17.

Moreover, the short throw projector 2 includes a polarized light beam splitter (PBS) 18, a reflective light modulator 19, a projection lens group 20, and a reflection mirror 21.

The light source unit 12 generates white light. For example, a solid-state light source such as a light-emitting diode (LED) and a laser diode (LD), a mercury lamp, a xenon lamp, or the like is disposed in the light source unit 12.

For example, a solid-state light source for RGB capable of emitting RGB color light beams may be used and white light W may be generated by combining these emitted light beams. Alternatively, a solid-state light source that emits light in a blue wavelength range and a phosphor that emits yellow fluorescent light when it is excited by blue light may be disposed. In this case, white light is emitted by combining the blue light and the yellow light.

The collimator lens 13 collimates white light emitted from the light source unit 12 and the fly eye lens 14 makes the luminance uniform.

The polarization conversion element 15 functions to control a polarized state of incident white light. In the present embodiment, white light is converted into light including linearly polarized light having a plane parallel to an XZ plane as an oscillation plane as a major component. Any optical element such as a PS converter may be used as the polarization conversion element 15.

In FIGS. 3 and 4, the light including the linearly polarized light having the plane parallel to the XZ plane as the oscillation plane as a major component is represented just as "X-polarized". Also, the light including the linearly polarized light having the plane parallel to the YZ plane as the oscillation plane as a major component is represented just as "Y-polarized".

The white light including the linearly polarized light having the plane parallel to the XZ plane as the oscillation plane as a major component enters the reflection mirror 17 via the condenser lens 16a and is reflected downward in the Y direction. The reflected white light enters the PBS 18.

The PBS 18 reflects the linearly polarized component of the white light having the X direction as the polarization direction and transmits the linearly polarized component of the white light having the Y direction as the polarization direction. Moreover, the PBS 18 is disposed so as to perform such separation of the polarized light in the plane parallel to the YZ plane.

As shown in FIG. 4, white light (X-polarized light) including linearly polarized light having a plane parallel to an XY-plane as an oscillation plane as a major component, which enters the PBS 18 from the upper side in the vertical direction, is reflected to the deep side (in the figure, the left-hand side) in the Z direction and enters the reflective light modulator 19.

The reflective light modulator 19 modulates and reflects incident white light on the basis of an externally supplied image signal. The reflective light modulator 19 emits the modulated white light as the image light L1 that constitutes a color image. Typically, a reflective liquid-crystal panel is used as the reflective light modulator 19, though not limited thereto. Any micro-display device such as a digital micro-mirror device (DMD) may be used.

It should be noted that any method may be employed as a method of generating a color image from white light by the use of the single reflective light modulator 19.

The white light is time-divided into light beams of RGB colors by the use of a color wheel, for example. Then, RGB color image light beams are generated and emitted on the basis of image signals for the respective colors. Alternatively, the white light may be continuously emitted without being time-divided and the reflective light modulator 19 in which three RGB color sub-pixels constitute one pixel may be used.

Moreover, a so-called color sequential system may be used. In this method, individual light sources such as LEDS and LDs for RGB colors emit light time-sequentially and form RGB color image light beams on the basis of image signals for the respective colors.

In addition, a method of generating a color image by the use of a plurality of reflective light modulators 19 may be employed as another configuration example. For example, this method may be a hybrid method combining color separation based on polarization using two reflective liquid-crystal modulate elements 19 arranged via the single PBS 18 and a color sequential technique using a time division fluorescent wheel or the like. In this case, a configuration in which yellow light emitted by the phosphor and blue light for excitation are time-sequentially emitted may be employed for white light. Any other method using the plurality of reflective light modulators 19 may be employed.

As shown in FIG. 4, the reflective light modulator 19 emits the image light L1 (Y-polarized light) including the linearly polarized light having the plane parallel to the YZ plane as the oscillation plane as a major component. The image light L1 passes through the PBS 18 and enters the reflection mirror 21 via the projection lens group 20.

The reflection mirror 21 folds the image light L1 including the linearly polarized light having the plane parallel to the YZ plane as the oscillation plane as a major component. Then, the image light L1 is emitted to the screen 3.

FIG. 4 shows the reflection mirror 21 having a planar reflection surface, though an aspheric mirror having an aspheric reflection surface is typically used. As a matter of course, the present technology is not limited to such a configuration.

Employing the configuration shown in FIGS. 3 and 4 can achieve the compact short throw projector 2 with a small thickness (size in the Y direction). It is thus very advantageous for configuring the image projection system 1 in a narrow space such as a vehicle interior space.

The configuration of the optical system in the short throw projector 2, the image generation method, and the like are not limited, but may be arbitrarily set as a matter of course.

Figure 5:
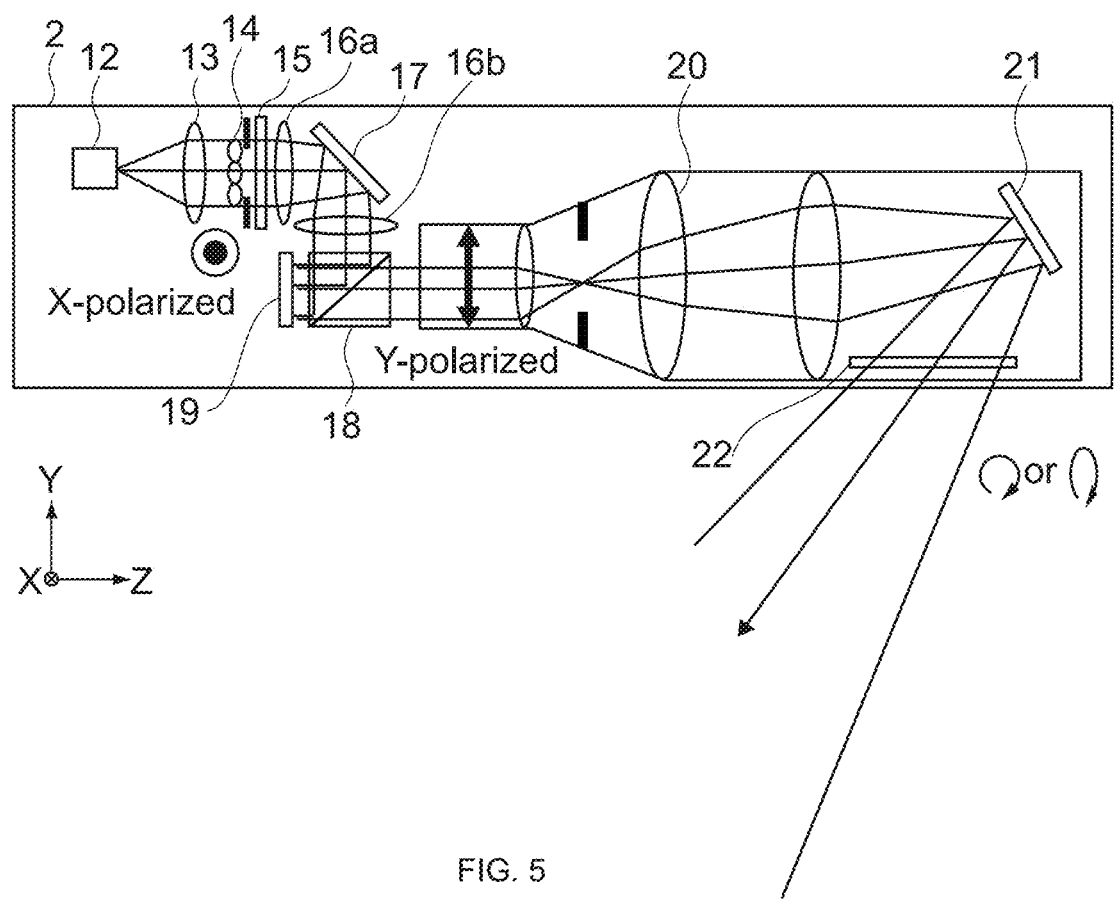
FIG. 5 A schematic view showing another configuration example of the optical system in the short throw projector.

FIG. 5 is a schematic view showing another configuration example of the optical system in the short throw projector 2.

FIG. 5 shows a configuration example in a case where the image light L1 including circularly polarized light or elliptically polarized light as a major component is emitted.

In the short throw projector 2 shown in FIG. 5, a phase difference plate 22 is disposed as an additional optical element. The phase difference plate 22 is disposed at an emission port for the image light L1 in a stage following the reflection mirror 21.

For example, a quarter wave plate (QWP) is arranged as the phase difference plate 22 so that the optical axis intersects with the YZ plane by an angle of 45 degrees. This can emit the image light L1 including the circularly polarized light as a major component.

Moreover, the quarter wave plate is arranged so that the optical axis intersects with the YZ plane by an angle different from 45 degrees. This can emit the image light L1 including the elliptically polarized light as a major component.

As a matter of course, the present technology is not limited to the quarter wave plate (QWP), and the phase difference plate 22 having a predetermined phase difference can be used as appropriate.

For example, arranging the phase difference plate 22 having the predetermined phase difference at a predetermined azimuthal angle can emit the image light L1 including the circularly polarized light as a major component. Moreover, similarly, arranging the phase difference plate 22 having the predetermined phase difference at a different predetermined azimuthal angle can emit the image light L1 including the elliptically polarized light as a major component.

For example, adjusting the optical axis direction (azimuthal angle) of the phase difference plate 22 as appropriate can adjust the major axis direction and ellipticity of the elliptically polarized light. For example, the image light L1 including elliptically polarized light having a major axis direction parallel to the YZ plane as a major component can also be emitted. It should be noted that the major axis direction of the elliptically polarized light can be defined by an azimuthal angle of the ellipse.

It should be noted that the phase difference plate 22 may be disposed at any position as long as it is in a stage following the PBS 18. For example, it may be disposed at any position, e.g., between the PBS 18 and the projection lens group 20, inside the projection lens group 20, or between the projection lens group 20 and the reflection mirror 21.

[Configuration Example of Corrugated Surface]

Figures 6A, 6B:
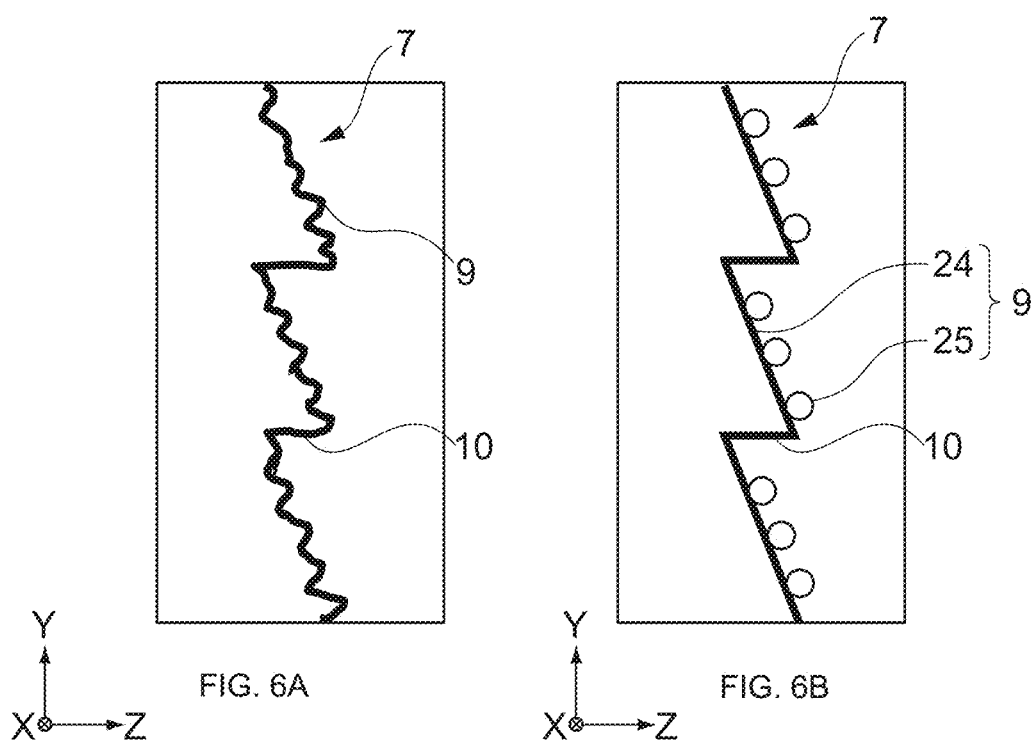
FIGS. 6A and 6B A schematic view showing a configuration example of a corrugated surface.

FIGS. 6A and 6B are schematic views showing a configuration example of the corrugated surface 7.

In the example shown in FIG. 6A, the plurality of reflection surfaces 9 is constituted by a material having light transmissivity and is configured as rough surfaces. This can diffuse and reflect the image light L1. It should be noted that the structure for diffusing the image light L1 can also be referred to as a diffusing structure or scattering structure. In the example shown in FIG. 6A, the diffusing structure (scattering structure) is achieved by forming rough surfaces of a material having light transmissivity.

An example of the manufacturing method for the corrugated surface 7 shown in FIG. 6A will be described.

A die including the shape of the corrugated surface 7 is fabricated by cutting, for example. Here, the die is fabricated to have planar surfaces corresponding to the reflection surfaces 9 and the connection surfaces 10. In the present embodiment, a sawtooth shape die is cut.

Rough surfaces are formed on the die by corrosion treatment, for example.

The minute structure (corrugated surface) of the die is transferred to a transparent material having light transmissivity. For example, hot pressing, injection molding, or UV molding may be used. Moreover, for example, a thermoplastic resin, a UV curable resin, or an electron beam curable resin may be used as the transparent material. As a matter of course, the present technology is not limited to those techniques, materials, and the like.

A half mirror film is deposited on the transparent material to which the corrugated surface has been transferred. For example, a metal film such as chromium and aluminum or a dielectric multi-layer film is deposited.

Another transparent material is connected to the transparent material so as to cover the corrugated surface 7.

Another example of the manufacturing method for the corrugated surface 7 shown in FIG. 6A will be described.

A die including the shape of the corrugated surface 7 is fabricated by cutting, for example. Here, the die is fabricated to have planar surfaces corresponding to the reflection surfaces 9 and the connection surfaces 10. In the present embodiment, a sawtooth shape die is cut.

The minute structure (corrugated surface constituted by the planar shapes) of the die is transferred to a transparent material having light transmissivity.

A rough surface is formed on the corrugated surface of the transparent material by sandblasting, for example.

A half mirror film is deposited on the transparent material to which the corrugated surface has been transferred. For example, a metal film such as chromium and aluminum or a dielectric multi-layer film is deposited.

Another transparent material is connected to the transparent material so as to cover the corrugated surface 7.

In the example shown in FIG. 6B, the plurality of reflection surfaces 9 is configured by disposing light-diffusing materials 25 on a surface 24 made of a material having light transmissivity. The diffusing structure (scattering structure) is achieved, such that it can diffuse and reflect the image light L1.

For example, inorganic light-diffusing materials such as silica, muscovite, alumina, calcium carbonate, and glass beads, acrylic resins, styrenic resins, and copolymers of them, and non-crystalline organic light-diffusing materials such as silicone resins are used as the light-diffusing materials 25. Any other light-diffusing materials may be used.

Moreover, how the light-diffusing materials are distributed on the reflection surface 9 is also not limited, but may be arbitrarily set. For example, the light-diffusing materials 25 are sparsely arranged disposed on the surface 24.

An example of the manufacturing method for the corrugated surface 7 shown in FIG. 6B will be described.

A die including the shape of the corrugated surface 7 is fabricated by cutting, for example. The die is fabricated to have planar surfaces corresponding to the reflection surfaces 9 and the connection surfaces 10. In the present embodiment, a sawtooth shape die is cut.

The minute structure (corrugated surface constituted by the planar shapes) of the die is transferred to a transparent material having light transmissivity.

A half mirror film is deposited on the transparent material to which the corrugated surface has been transferred. For example, a metal film such as chromium and aluminum or a dielectric multi-layer film is deposited.

The light-diffusing materials are sprayed on the corrugated surface. Alternatively, a dispersion of the light-diffusing materials is applied and dried on the corrugated surface.

Another transparent material is connected to the transparent material so as to cover the corrugated surface 7.

[Configuration Example of Optical Element Unit]

FIGS. 7A, 7B, 8A, 8B, 9A, 9B, 10A, and 10B are schematic views showing configuration examples of the optical element unit 5.

In the present embodiment, a polarizing plate (linear polarizing plate) 27 with a direction of a light shielding axis defined to be a predetermined direction is used.

In a case of using an absorptive polarizer as the polarizing plate 27, the absorption axis is the light shielding axis.

The polarizing plate 27 absorbs a linearly polarized component having a plane including an absorption axis direction of the polarizing plate 27 as an oscillation plane out of the image light L1 that is not reflected on the plurality of reflection surfaces 9 and passes through the corrugated surface 7.

On the other hand, a linearly polarized component having a plane including a transmission axis direction of the polarizing plate 27 as an oscillation plane out of the background light L2 passes through the screen unit 4 and travels forward. It should be noted that the directions of the absorption axis and the transmission axis of the polarizing plate 27 are orthogonal.

In a case of using a reflective polarizer as the polarizing plate 27, the reflection axis is the light shielding axis.

The polarizing plate 27 reflects a linearly polarized component having a plane including a reflection axis direction of the polarizing plate 27 as an oscillation plane out of the image light L1 that is not reflected on the plurality of reflection surfaces 9 and passes through the corrugated surface 7.

On the other hand, a linearly polarized component having a plane including a transmission axis direction of the polarizing plate 27 as an oscillation plane out of the background light L2 passes through the screen unit 4 and travels forward. It should be noted that the directions of the reflection axis and the transmission axis of the polarizing plate 27 are orthogonal.

In a case of using either the absorptive polarizer or the reflective polarizer as the polarizing plate 27, the backward transmission of the image light L1 can be restricted. Moreover, at least part of the background light L2 entering from the back side can be transmitted.

It should be noted that any polarizer such as an iodine-based polarizer, a dye-based, dichroic dye polarizer, and a wire grid polarizer may be used as the polarizing plate 27.

For example, light including linearly polarized light having a plane including the direction of the light shielding axis of the polarizing plate 27 as an oscillation plane as a major component is emitted as the image light L1. Accordingly, the image light L1 passing through the screen unit 4 can be substantially completely shielded.

As a matter of course, the backward transmission of the image light L1 is restricted also with respect to the image light L1 including the circularly polarized light or the elliptically polarized light as a major component. For example, in a case of the elliptically polarized light as the image light L1, it is assumed to be the image light L1 including elliptically polarized light having a major axis direction parallel to a plane including the direction of the light shielding axis of the polarizing plate 27 as a major component. This can enhance the effect of restricting the backward transmission of the image light L1.

It should be noted that controlling the polarized state of the image light L1 in accordance with the direction of the light shielding axis of the polarizing plate 27 can also be said to be setting the direction of the light shielding axis of the polarizing plate 27 in accordance with the polarized state of the image light L1. That is, as to the application of the present technology, the polarized state of the image light L1 may be controlled in accordance with the configuration of the optical element unit 5 (e.g., the direction of the light shielding axis of polarizing plate 27). Moreover, the configuration of the optical element unit 5 (e.g., the direction of the light shielding axis of polarizing plate 27) may be set as appropriate in accordance with the polarized state of the image light L1.

Hereinafter, descriptions will be given, exemplifying a case of using the absorptive polarizer as the polarizing plate 27. That is, descriptions will be given exemplifying a case where the light shielding axis is the absorption axis.

Moreover, also in a case of using a polarizing plate (e.g., a second polarizing plate 29 shown in FIGS. 8A and 8B) different from the polarizing plate 27, it is assumed to be the absorptive polarizer. As a matter of course, the reflective polarizer may be used as appropriate.

Figure 7A:
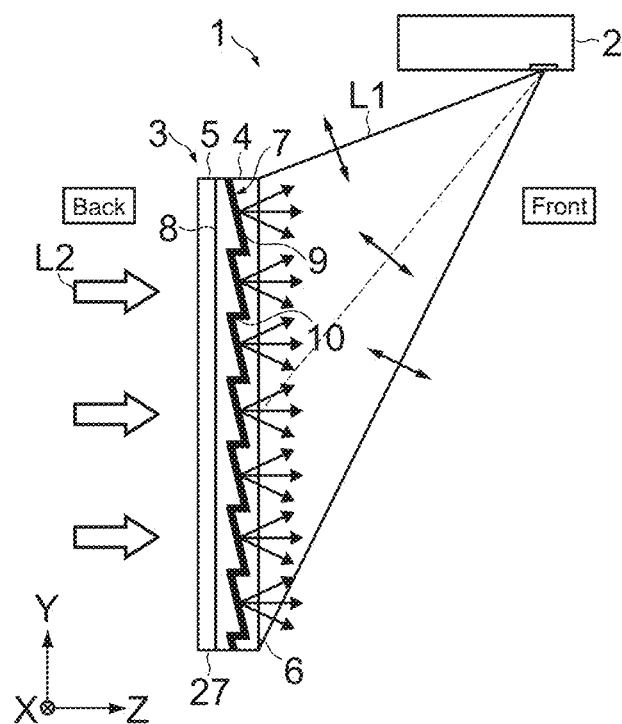
FIGS. 7A and 7B A schematic view showing a configuration example of an optical element unit.
Figure 7B:
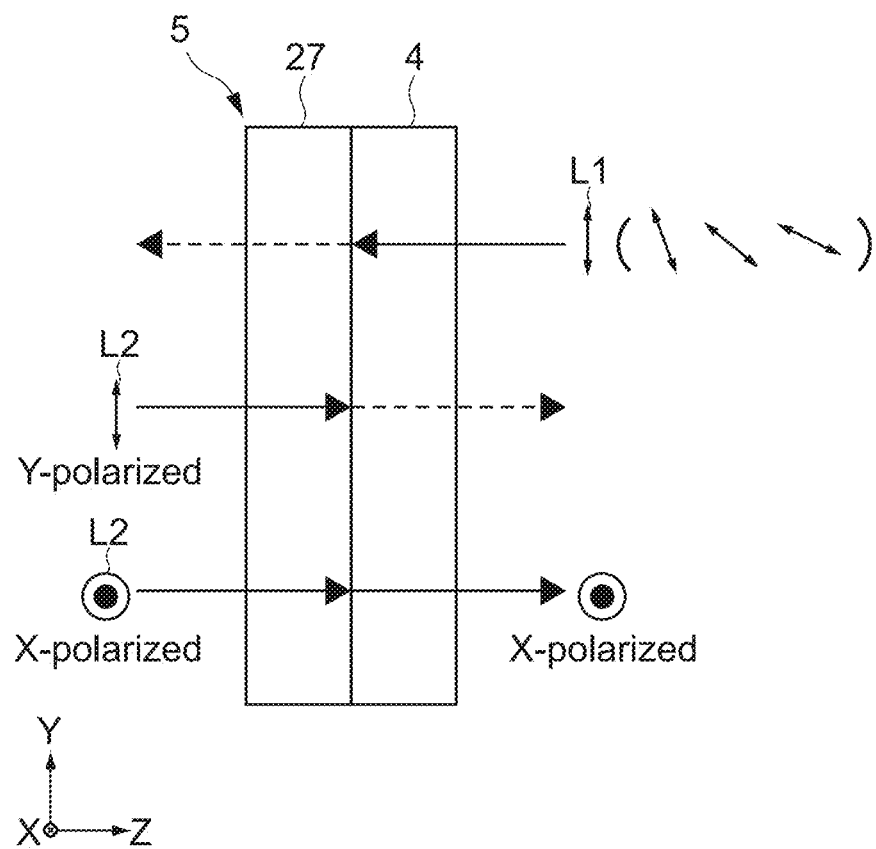

In the example shown in FIGS. 7A and 7B, as to the polarizing plate 27, the absorption axis direction is defined using the Y direction (vertical direction) as a reference. Specifically, the polarizing plate 27 is disposed so that the absorption axis direction is the Y direction (vertical direction).

Light including the linearly polarized light having the plane parallel to the YZ plane as the oscillation plane as a major component is emitted as the image light L1.

As shown in FIG. 7B, the polarizing plate 27 absorbs the image light L1 passing through the screen unit 4.

It should be noted that as illustrated in FIGS. 7A and 7B, a polarization direction of the linearly polarized light having the plane parallel to the YZ plane as the oscillation plane can vary depending on an angle of incidence (incident position) of the image light L1 entering the screen 3. Specifically, a tilt to the screen 3 varies depending on the angle of incidence of the image light L1. It can also be said that the linearly polarized component in the Z direction varies depending on the angle of incidence of the image light L1.

The polarizing plate 27 having the Y direction as the absorption axis direction can also absorb such linearly polarized light sufficiently. That is, the absorption effect of the polarizing plate 27 can be sufficiently exerted irrespective of a tilt of the linearly polarized light in the plane parallel to the YZ plane.

Moreover, the linearly polarized component in the X direction can be generated in the image light L1 entering the both left and right ends and the like of the image. It is difficult for the polarizing plate 27 to absorb the linearly polarized component in the X direction. However, the linearly polarized component in the X direction is a very small part of the whole, so substantially entire part of the image light L1 can be shielded and a high effect is exerted.

As shown in FIG. 7B, the polarizing plate 27 absorbs the linearly polarized component (Y-polarized light) having the plane parallel to the YZ plane as the oscillation plane out of the background light L2 entering the optical element unit 5 from the back side. The linearly polarized component (X-polarized light) having the plane parallel to the XZ plane as the oscillation plane out of the background light L2 passes through the polarizing plate 27 and the screen unit 4 and travels forward.

Figure 8A:
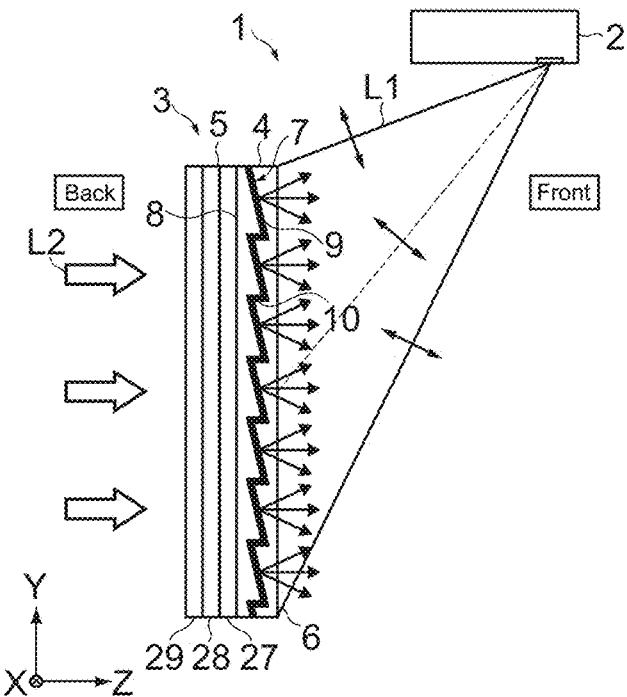
FIGS. 8A and 8B A schematic view showing a configuration example of the optical element unit.
Figure 8B:
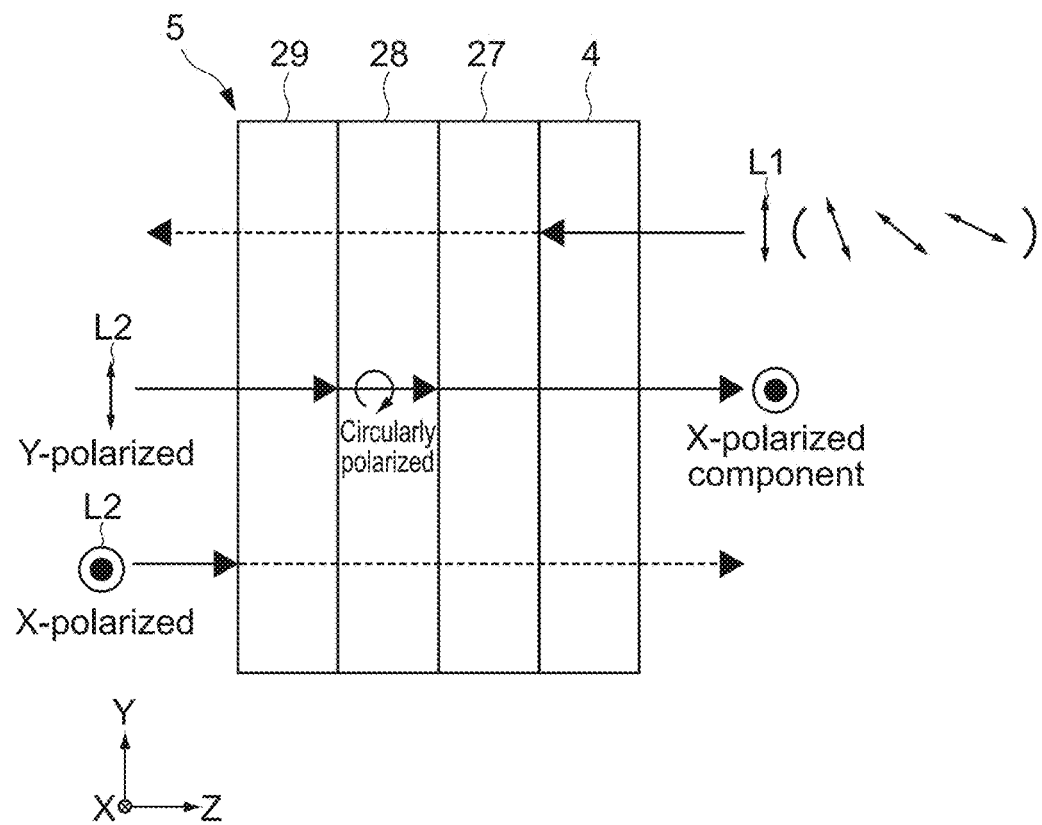

In the optical element unit 5 shown in FIGS. 8A and 8B, a quarter wave plate 28 and another polarizing plate 29 are disposed in addition to the polarizing plate 27.

The polarizing plate 27 will be referred to as a first polarizing plate 27 using the same reference sign. The polarizing plate 29 will be referred to as a second polarizing plate 29 using the same reference sign.

The quarter wave plate 28 is disposed on the back side of the first polarizing plate 27. Moreover, the quarter wave plate 28 converts the linearly polarized light having the absorption axis direction of the first polarizing plate 27, i.e., the Y direction as the polarization direction into circularly polarized light. Thus, the quarter wave plate 28 is disposed so that the optical axis intersects with the Y direction by an angle of 45 degrees.

The second polarizing plate 29 is disposed on the back side of the quarter wave plate 28. Moreover, the second polarizing plate 29 is disposed so that the absorption axis direction is orthogonal to the absorption axis direction of the first polarizing plate 27. That is, the second polarizing plate 29 is disposed so that the absorption axis direction is the X direction.

As shown in FIG. 8B, the first polarizing plate 27 absorbs the image light L1 passing through the screen unit 4.

The linearly polarized component (Y-polarized light) having the plane parallel to the YZ plane as the oscillation plane out of the background light L2 entering the optical element unit 5 from the back side passes through the second polarizing plate 29 and enters the quarter wave plate 28. Then, the quarter wave plate 28 converts it into circularly polarized light. An X-polarized light component having the plane parallel to the XZ plane as an oscillation plane out of the circularly polarized light passes through the first polarizing plate 27 and the screen unit 4 and travels forward.

The second polarizing plate 29 absorbs the linearly polarized component (X-polarized light) having the plane parallel to the XZ plane as the oscillation plane out of the background light L2.

Figure 9A:
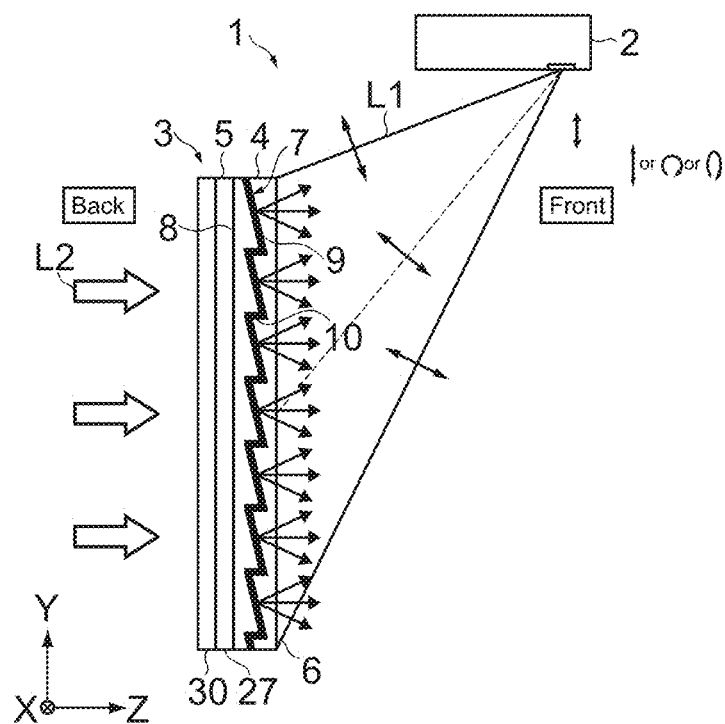
FIGS. 9A and 9B A schematic view showing a configuration example of the optical element unit.
Figure 9B:
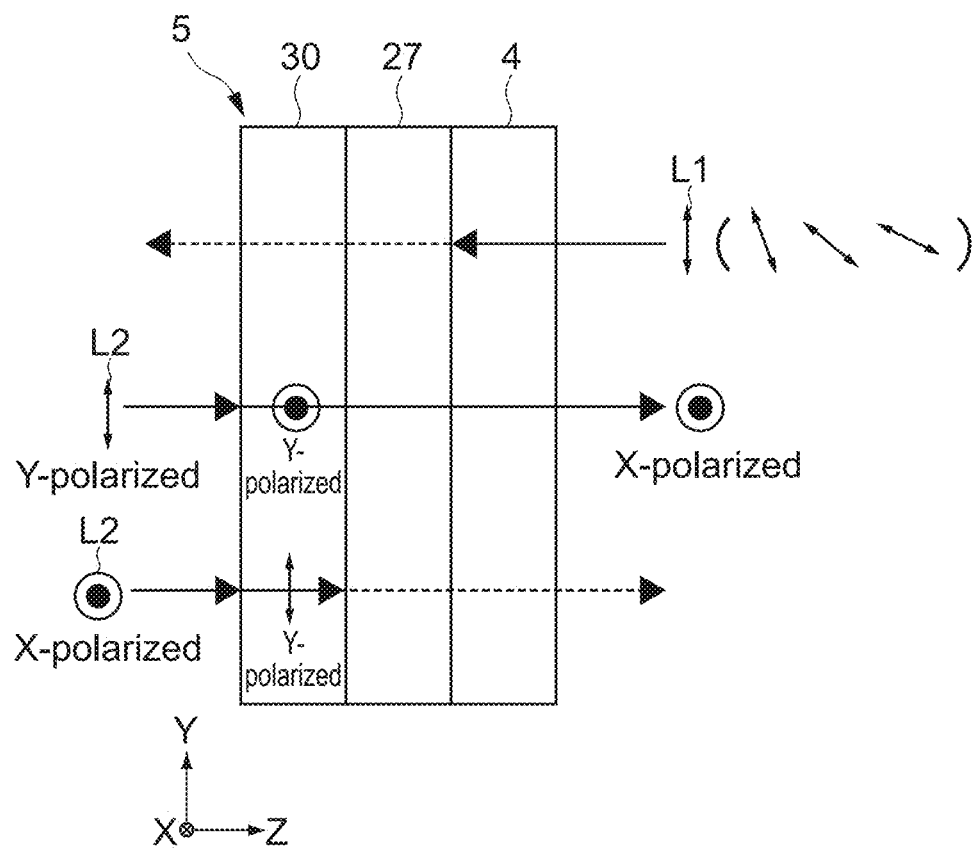

In the optical element unit 5 shown in FIGS. 9A and 9B, a half-wave plate (HWP) 30 is disposed in addition to the polarizing plate 27.

The half-wave plate 30 is disposed on the back side of the polarizing plate 27. Moreover, the half-wave plate 30 converts the linearly polarized light having the absorption axis direction of the polarizing plate 27, i.e., the Y direction as the polarization direction into linearly polarized light having a direction orthogonal to the absorption axis direction of the polarizing plate 27 as a polarization direction, i.e., having the X direction as the polarization direction.

That is, the half-wave plate 30 rotates the polarization direction by 90 degrees with respect to the linearly polarized light having the Y direction as the polarization direction. Thus, the half-wave plate 30 is disposed so that the optical axis intersects with the Y direction by an angle of 45 degrees.

As shown in FIG. 9B, the polarizing plate 27 absorbs the image light L1 passing through the screen unit 4.

The half-wave plate 30 converts the linearly polarized component (Y-polarized light) having the plane parallel to the YZ plane as the oscillation plane out of the background light L2 entering the optical element unit 5 from the back side into X-polarized light. The X-polarized light passes through the polarizing plate 27 and the screen unit 4 and travels forward.

The half-wave plate 30 converts the linearly polarized component (X-polarized light) having the plane parallel to the XZ plane as the oscillation plane out of the background light L2 into Y-polarized light. The polarizing plate 27 absorbs the Y-polarized light.

A configuration example of the optical element unit 5 in a case where light including circularly polarized light or elliptically polarized light as a major component is emitted as the image light L1 will be described with reference to FIGS. 10A and 10B.

A polarizing plate 27 with an absorption axis direction defined to be a predetermined direction and a phase difference plate 31 are used as the optical element unit 5. The phase difference plate 31 is disposed on the front side of the polarizing plate 27.

In a case where light including circularly polarized light as a major component is emitted as the image light L1, a quarter wave plate is used as the phase difference plate 31. The quarter wave plate converts the circularly polarized light into linearly polarized light having an absorption axis direction of the polarizing plate 27 as a polarization direction. For example, the quarter wave plate is disposed so that the optical axis intersects with the absorption axis direction of the polarizing plate 27 by an angle of 45 degrees.

In a case where light including elliptically polarized light as a major component is emitted as the image light L1, the phase difference plate 31 is disposed so that the major axis direction and the ellipticity of the elliptically polarized light and an obtained phase difference of the phase difference plate 31 are in a relationship that can convert the elliptically polarized light into linearly polarized light having the absorption axis direction of the polarizing plate 27 as the polarization direction. As a matter of course, the quarter wave plate may be used.

By employing such a configuration, the image light L1 that is not reflected on the plurality of reflection surfaces 9 and passes through the corrugated surface 7 is converted into linearly polarized light having a plane parallel to an absorption axis of the polarizing plate 27 as an oscillation plane. The polarizing plate 27 absorbs the linearly polarized light.

On the other hand, a linearly polarized component having a plane including a transmission axis direction of the polarizing plate 27 as an oscillation plane out of the background light L2 passes through the screen unit 4 and travels forward.

Accordingly, the backward transmission of the image light L1 can be restricted. Moreover, at least part of the background light L2 entering from the back side can be transmitted.

Figure 10A:
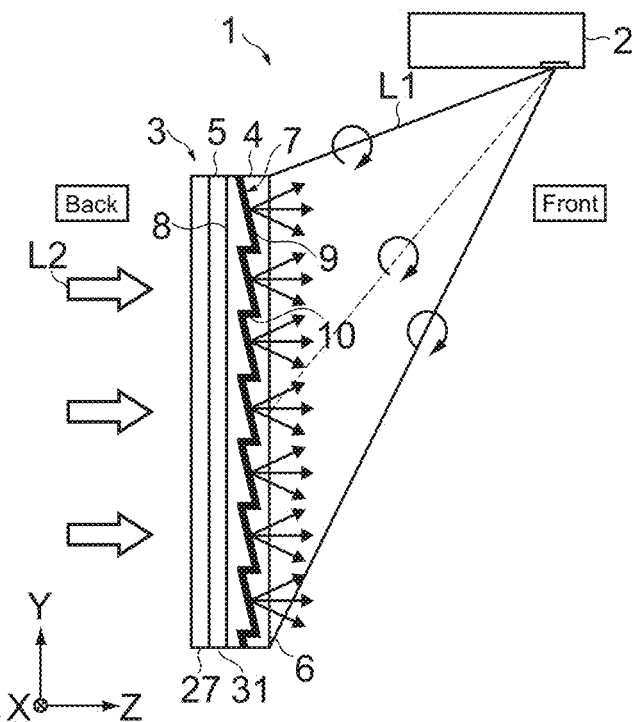
FIGS. 10A and 10B A schematic view showing a configuration example of the optical element unit.
Figure 10B:
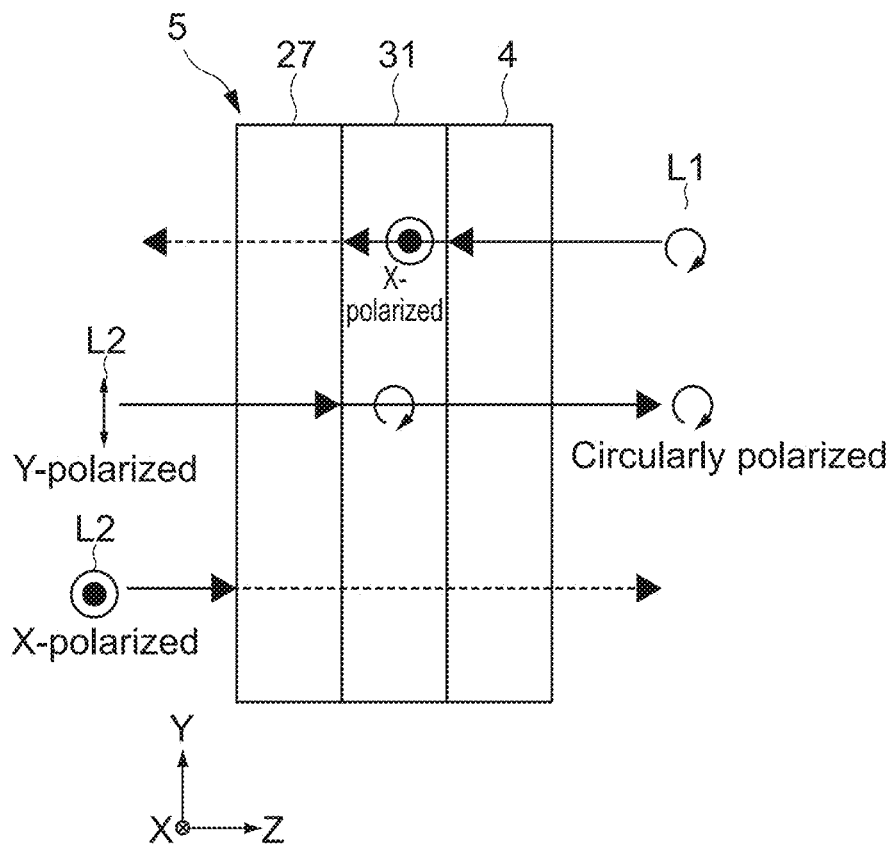

In the example shown in FIGS. 10A and 10B, light including circularly polarized light as a major component is emitted as the image light L1.

The polarizing plate 27 is disposed so that the absorption axis direction is the X direction (horizontal direction).

A quarter wave plate is used as the phase difference plate 31 and the circularly polarized light is converted into linearly polarized light having the absorption axis direction (i.e., the X direction) of the polarizing plate 27 as the polarization direction. It should be noted that in a case where linearly polarized light having the Y direction as the polarization direction has entered the phase difference plate (quarter wave plate) 31, it is converted into circularly polarized light.

As shown in FIG. 10B, the phase difference plate (quarter wave plate) 31 converts the image light L1 passing through the screen unit 4 into linearly polarized light (X-polarized light) having the plane parallel to the XZ plane as an oscillation plane. The polarizing plate 27 absorbs the X-polarized light.

The linearly polarized component (Y-polarized light) having the plane parallel to the YZ plane as the oscillation plane out of the background light L2 entering the optical element unit 5 from the back side passes through the polarizing plate 27 and enters the phase difference plate (quarter wave plate) 31. Then, the phase difference plate (quarter wave plate) 31 converts it into circularly polarized light. The circularly polarized light passes through the screen unit 4 and travels forward.

The polarizing plate 27 absorbs the linearly polarized component (X-polarized light) having the plane parallel to the XZ plane as the oscillation plane out of the background light L2.

[Leaking Light-Reducing Effect]

In the present embodiment, the backward transmission of the image light L1 of the image light L1 is restricted. This can exert the effect of reducing light leaking backward.

If a person or the like on the back side can see light (so-called hot spot) at the emission port from the short throw projector 2 in image projection using a transparent screen as in the present embodiment, the person or the like may feel discomfort.

Moreover, if the person or the like on the back side can see image light of an image that the viewer wishes to enjoy on the front side, the person or the like may see the contents of the image, which is also undesirable in terms of privacy protection.

Since applying the present technology can exert the leaking light-reducing effect, it can suppress such problems.

[Surface Reflection-Reducing Effect]

The image light L1 can be regularly reflected on the screen surface 6. If surface reflection light (regularly reflected component) on the screen surface 6 increases, it can cause a reflection ghost of the image light L1, for example, and unwanted reflection, scattering, and the like of unnecessary light can occur on the front side of the screen 3.

As illustrated in FIGS. 7A, 7B, 8A, 8B, 9A, 9B, 10A, and 10B, light including the linearly polarized light having the plane parallel to the YZ plane as the oscillation plane as a major component is emitted as the image light L1. Such light becomes a P-polarized component with respect to the screen surface 6. Therefore, the surface reflection can be suppressed. That is, the surface reflection-reducing effect can be exerted, which can suppress the above-mentioned problems.

It should be noted that a high surface reflection-reducing effect is exerted as light that becomes a P-polarized component with respect to the screen surface 6, i.e., linearly polarized component having the Y direction as the polarization direction increases. For example, the image light L1 including elliptically polarized light having a major axis direction parallel to the YZ plane as a major component is emitted. In this case, a high surface reflection-reducing effect can be exerted.

[Background Light Noise-Reducing Effect]

In a case of using the screen 3 as the transparent screen as in the present embodiment, the background light L2 can act as noise due to its transparency.

For example, when the viewer views an image displayed on the screen 3, sunlight may be reflected on a road surface, a water surface, a field, or the like and overlap the image. In this case, the viewer can hardly see the image. Such background light noise is problematic when seeing both an outside scenery and a projected video.

In addition, it is also problematic in a case of using augmented reality (AR) application where information is projected on the screen 3 so as to overlap particular information of the background.

Light of sunlight reflected on a road surface, a water surface, or the like is light including the linearly polarized component (X-polarized light) having the plane parallel to the XZ plane as the oscillation plane as a major component.

Moreover, in a case of using the AR application, a virtual object is often displayed on the screen 3 with respect to an image displayed on a liquid-crystal display or organic EL display disposed on the back side. In addition, in an AR application, it is desirable to be able to see both a projected video and information on a display such as an electronic advertising board in a city. The liquid-crystal display or the like has a function of absorbing X-polarized light against sunlight radiation, so video light is often output as Y-polarized light.

In the embodiment illustrated in FIGS. 8A, 8B, 9A, 9B, 10A, and 10B, forward transmission of the X-polarized light of the background light L2 is restricted. Moreover, the Y-polarized light of the background light L2 is emitted forward.

Therefore, the background light noise including the X-polarized light as a major component can be sufficiently suppressed, and the visibility of the image displayed on the screen 3 can be sufficiently enhanced. Moreover, the image output with the Y-polarized light can be properly displayed on the front side, and the AR application can be properly used.

A very favorable viewing environment for the viewer using the image on the front side can be thus achieved.

As described above, the polarizing plate 27 is arranged by setting the absorption axis direction as appropriate in accordance with the polarized state of the image light L1. Moreover, the phase difference plate (half-wave plate, quarter wave plate, any other wave plate applying a predetermined phase difference) is arranged as appropriate.

This can achieve the above-mentioned "leaking light-reducing effect", "surface reflection-reducing effect", and "background light noise-reducing effect".

It should be noted that in a case of using the reflective polarizer as the polarizing plate 27, a reflection ghost of the image light L1 reflected on the polarizing plate 27 can be generated. In view of this, the configuration using the absorptive polarizer as the polarizing plate 27 is more favorable for achieving a favorable viewing environment.

It should be noted that the configuration of the screen 3 may include a layer that lowers the transmittance uniformly. It may further include a light control function capable of actively controlling the transmittance.

[Method of Setting Absorption Axis Direction of Polarization Plate]

As described above, controlling the polarized state of the image light L1 as appropriate can achieve the "leaking light-reducing effect" also in a case where the absorption axis direction of the polarizing plate 27 is set to be an arbitrary direction. Thus, the present technology also includes a case where the absorption axis direction of the polarizing plate 27 is set to be an arbitrary direction.

Figure 11A:
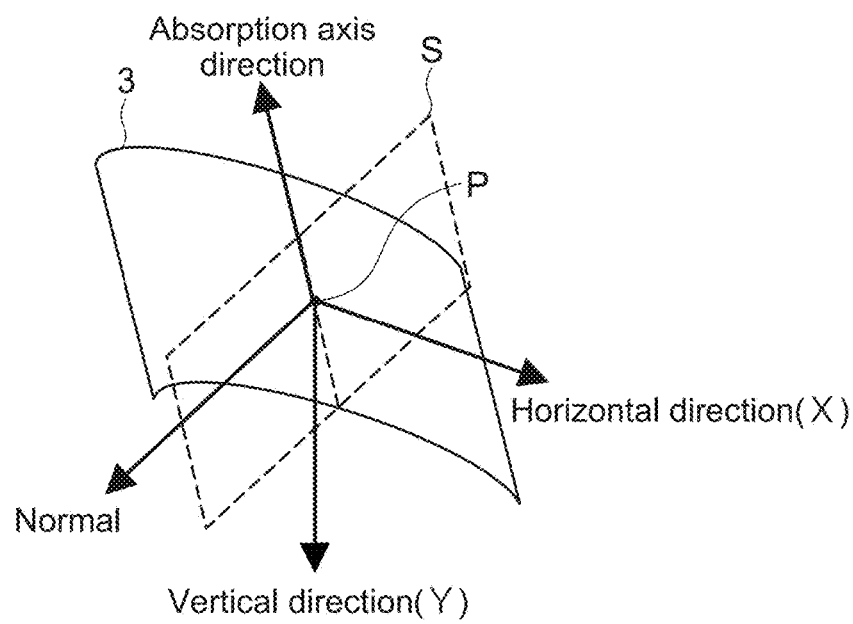
FIGS. 11A, 11B, and 11C A schematic view for describing an example of a method of setting an absorption axis direction of a polarizing plate.
Figure 11B:
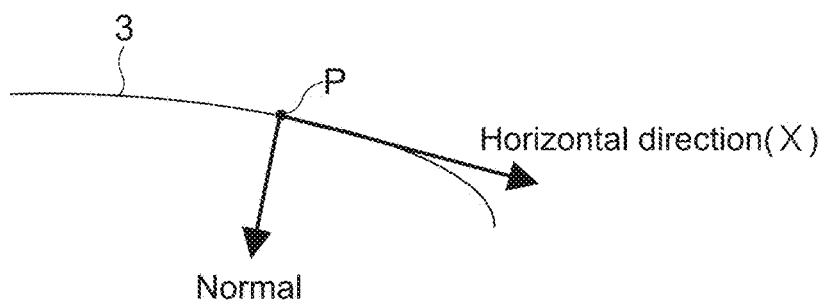
Figure 11C:
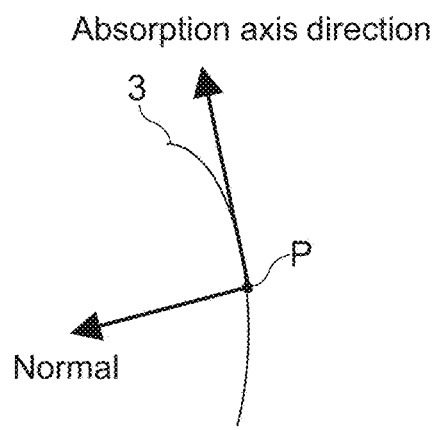

FIGS. 11A, 11B, and 11C are schematic views for describing an example of a method of setting the absorption axis direction of the polarizing plate 27.

FIG. 11A is a perspective view of the screen 3 as viewed from the obliquely upper side.

FIG. 11B is a top view of the screen 3 as viewed from the upper side.

FIG. 11C is a side view of the screen 3 as viewed in the left and right-hand directions.

As shown in FIGS. 11A, 11B, and 11C, the screen 3 may be configured as a curved screen. That is, the screen 3 (the screen unit 4 and the optical element unit 5) may have a curved surface shape.

For example, as the screen 3 is viewed from the side in the upper and lower directions or the left and right-hand directions, the shape of the screen 3 may be designed to have a radius of curvature of approximately one hundred to several thousands as R (mm). Moreover, a local region of the screen 3 may be configured to have a curved surface shape.

First of all, a predetermined reference point P is set on the screen 3 as shown in FIGS. 11A, 11B, and 11C. The method of setting the reference point P is not limited, and for example, a point suitable for image display by the screen 3 may be employed. For example, a point crossing the optical axis of the image light L1 on the screen 3 is set as the reference point P. It should be noted that the optical axis of the image light L1 can be defined as a central axis of a light flux of the image light L1 emitted to the screen 3, for example.

Otherwise, the reference point P may be set by an arbitrary method, for example, by using a center point of the screen 3, a point crossing the optical axis of the short throw projector 2, or a center point of a displayed image. It should be noted that the center point of the screen 3, the point crossing the optical axis of the short throw projector 2, and the center point of the displayed image can be identical to the point crossing the optical axis of the image light L1.

First of all, a case where the configuration shown in FIGS. 7A, 7B, 8A, 8B, 9A. and 9B are employed as the optical element unit 5 will be described.

As shown in FIG. 11A, a plane including the normal line at the reference point P on the screen 3 and the vertical direction (Y direction) is assumed to be a reference plane S. The absorption axis direction of the polarizing plate 27 is set to be orthogonal to the normal line at the reference point P and parallel to the reference plane S. In this case, the direction orthogonal to each of the normal line direction and the absorption axis direction, i.e., the perpendicular direction of the reference plane S is the horizontal direction (X direction).

In a case where the absorption axis direction of the polarizing plate 27 is set in this manner, the "surface reflection-reducing effect" and the "background light noise-reducing effect" as well as the "leaking light-reducing effect" can be achieved.

In a case where the configuration shown in FIGS. 10A and 10B are employed as the optical element unit 5, the absorption axis direction of the polarizing plate 27 is set in parallel with the normal line of the reference plane S. Accordingly, the "surface reflection-reducing effect" and the "background light noise-reducing effect" as well as the "leaking light-reducing effect" can be achieved.

It should be noted that in the example shown in FIGS. 1, 2A, 2B, 3, 4, 5, 6A, 6B, 7A, 7B, 8A, 8B, 9A, 9B, 10A, and 10B, the screen 3 constituted by the planar shape is disposed in the vertical direction (Y direction). In this case, the point crossing an optical axis O of the image light L1 as shown in FIG. 1 is assumed to be the predetermined reference point P. In this case, the reference plane S including the normal line at the predetermined reference point P and the vertical direction is the YZ plane including the reference point P.

The direction orthogonal to the normal line at the predetermined reference point P and parallel to the reference plane S is the Y direction (vertical direction). Moreover, the direction parallel to the perpendicular line on the reference plane S is the X direction (horizontal direction).

Therefore, in the embodiment shown in FIGS. 1, 2A, 2B, 3, 4, 5, 6A, 6B, 7A, 7B. 8A, 8B, 9A, 9B, 10A, and 10B, the configuration in which the absorption axis direction of the polarizing plate 27 is set in the Y direction and the configuration in which the absorption axis direction of the polarizing plate 27 is set in the X direction can also be said to be the configuration in which the method of setting the absorption axis direction of the polarizing plate 27 by using the reference plane S is employed.

[Image Display Direction (Directional Direction)]

Figure 12A:
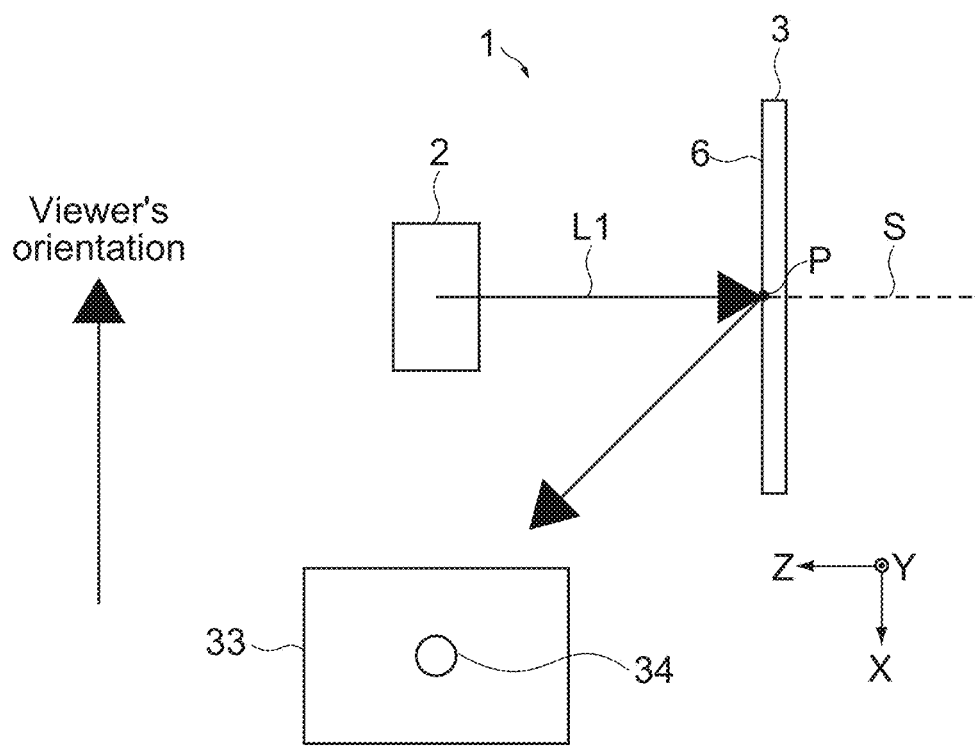
FIGS. 12A and 12B A schematic view showing a setting example of an image display direction (directional direction).
Figure 12B:
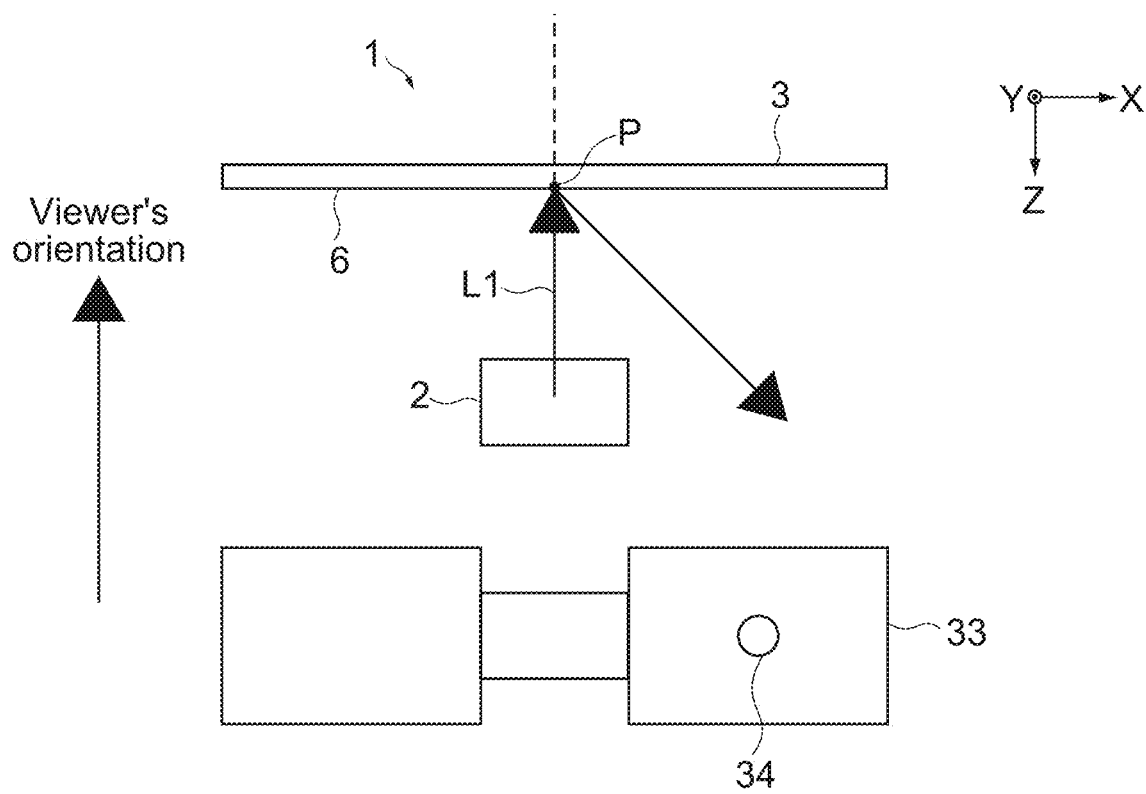

FIGS. 12A and 12B are schematic views showing a setting example of the image display direction (directional direction).

FIGS. 12A and 12B are schematic views showing configuration examples of this image projection system 1 with respect to a seat 33 on which the viewer sits.

The viewer sits on the seat 33 while the viewer faces forward (in the figure, upward). An assumed viewing position 34 is set using the seat 33 as a reference. The assumed viewing position 34 is assumed to be a position where the user views the image. The assumed viewing position 34 can also be said to be a viewing position where the user seated on the seat 33 views the image.

For example, an estimation position of the eyes of the viewer seated on the seat 33, an estimation position of the head of the viewer seated on the seat 33, or the like is set as the assumed viewing position 34. For example, average data of human body structures may be used.

Alternatively, an upper end position of the backrest of the seat 33, a center position of the seat 33, or the like may be set as the assumed viewing position 34, using the seat 33 as a reference.

In the example shown in FIG. 12A, the screen 3 is disposed on the right front side with respect to the viewer's orientation. Then, the short throw projector 2 is installed on the ceiling side, and the image light L1 is emitted from the front with respect to the screen 3 (in the figure, rightward from the left-hand side).

The screen 3 displays an image by diffusing and reflecting the emitted image light L1 to the assumed viewing position 34. That is, the screen 3 is designed to diffuse and reflect the emitted image light L1 in a direction shifted leftward from the front (in an obliquely left direction as viewed from the screen 3).

In the example shown in FIG. 12B, the screen 3 is disposed in the front with respect to the viewer's orientation. Then, the short throw projector 2 is installed on the ceiling side, and the image light L1 is emitted from the front with respect to the screen 3 (in the figure, upward from the lower side).

In the example shown in FIG. 12B, the image projection system 1 is designed to be capable of displaying the image to the viewer seated on a right seat 33 of two front seats 33.

Therefore, the screen 3 displays an image by diffusing and reflecting the emitted image light L1 to an assumed viewing position 34 of the right seat 33. That is, the screen 3 is designed to diffuse and reflect the emitted image light L1 in a direction shifted leftward from the front (in an obliquely left direction as viewed from the screen 3).

Here, a point intersecting with the optical axis of the image light L1 on the screen 3 is defined as the reference point P and the reference plane S is set. The configuration shown in FIGS. 12A and 12B can also be said to be a configuration satisfying the following two conditions.

(Condition 1) The screen surface 6 is orthogonal to the reference plane S.

(Condition 2) The assumed viewing position 34 assumed to be a position for viewing the image is configured to depart from the reference plane S.

It should be noted that (Condition 1) also includes a state in which the screen surface 6 is rotated about the X direction (left and right-hand directions) as the center, i.e., a state in which the screen surface 6 is tilted forward or backward.

Moreover, in a case of the curved screen, it can be considered to have similar conditions by defining a tangential plane. For example, when a tangential plane at the reference point P is defined, the tangential plane is orthogonal to the reference plane S.

[Visibility-Enhancing Effect]

For example, in the position relationship between the screen and the viewer as illustrated in FIGS. 12A and 12B, the viewer does not sit at a position directly facing the short throw projector 2 and tShe screen 3 and views an image obliquely. Therefore, it is very important to enhance the oblique visibility.

In order to enhance the visibility, the luminance has to increase. However, simply increasing the amount of light of the short throw projector 2 increases heat generated by the light source, so the casing size of the short throw projector 2 is inevitably increased for cooling. It is thus difficult to arrange it in a narrow space such as a vehicle interior space.

In the present technology, designing the plurality of reflection surfaces 9 included in the corrugated surface 7 as appropriate can easily achieve the configuration shown in FIGS. 12A and 12B (Configuration satisfying the above-mentioned two conditions). Thus, the image can be displayed to the assumed viewing position 34.

Consequently, high visibility can be exerted, and the "visibility-enhancing effect" can be achieved.

[Specific Configuration Example of Corrugated Surface]

Figure 13A:
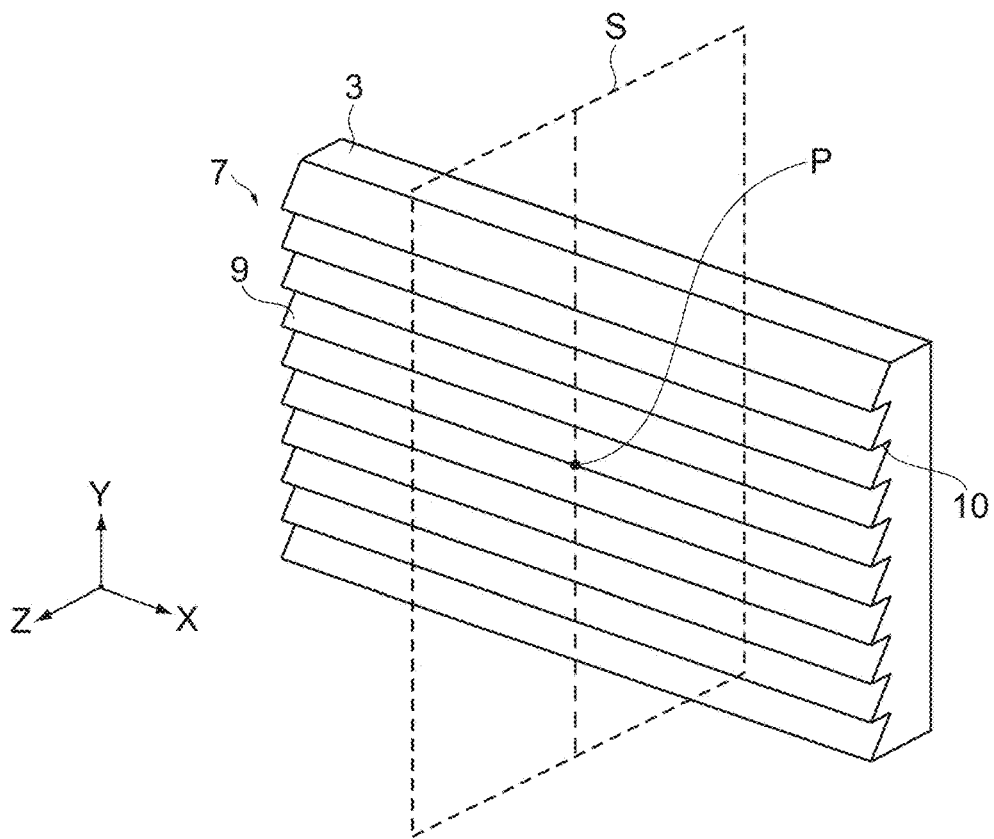
FIGS. 13A and 13B A schematic view showing a specific configuration example of the corrugated surface.
Figure 13B:
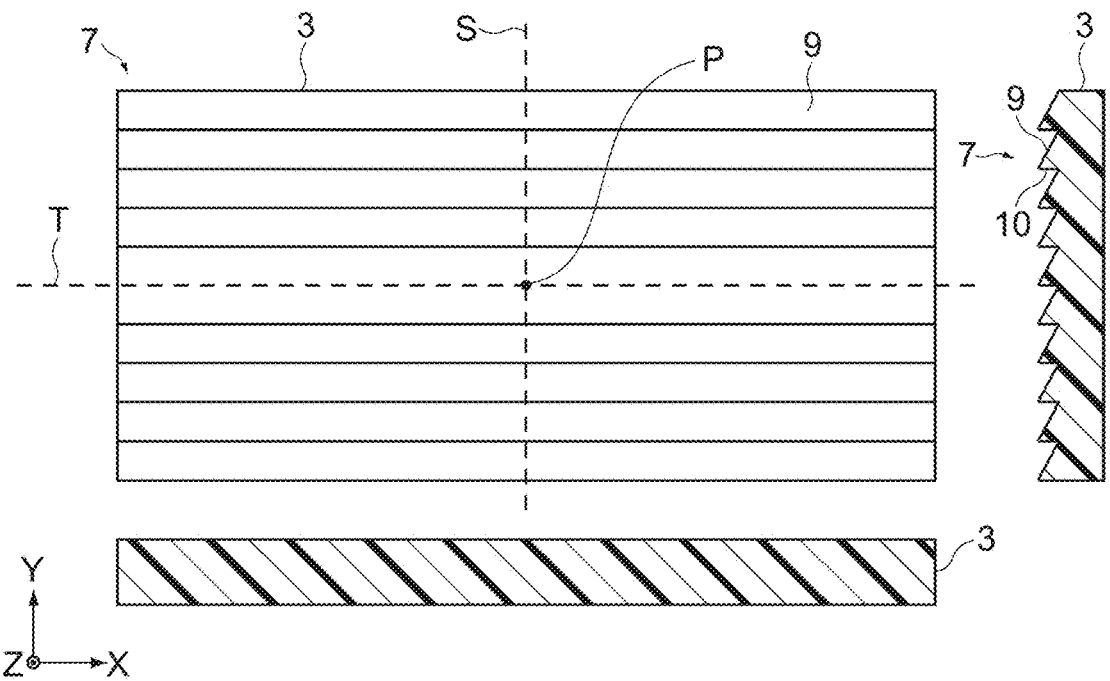

FIGS. 13A, 13B. 14A, 14B, 15A, and 15B are schematic views showing specific configuration examples of the corrugated surface 7.

In each figure, the width and pitch of the plurality of reflection surfaces 9 are shown in a significantly magnified state. The width and pitch (interval) of the plurality of reflection surfaces are actually designed by micrometers. Each figure can be considered as a partially enlarged view of the corrugated surface 7.

Moreover, in the cross-section of the corrugated surface 7, some portions that are curve lines are schematically shown as straight lines.

Moreover, the arrangement configuration illustrated in FIG. 1 is employed in FIGS. 13A, 13B, 14A, 14B, 15A, [to] and 15B. It should be noted that although the illustration is omitted, the screen surface 6 is parallel to the XY-plane.

Moreover, the center position of each screen 3 is set as the predetermined reference point P. The perpendicular line at the predetermined reference point is parallel to the Z direction and the reference plane S is a plane parallel to the YZ plane.

In each figure of FIGS. 13A, 13B, 14A, 14B, 15A, and 15B, FIGS. 13A, 14A, and 15A are perspective views of the screen 3 as viewed obliquely from the right upper side.

Figure 14A:
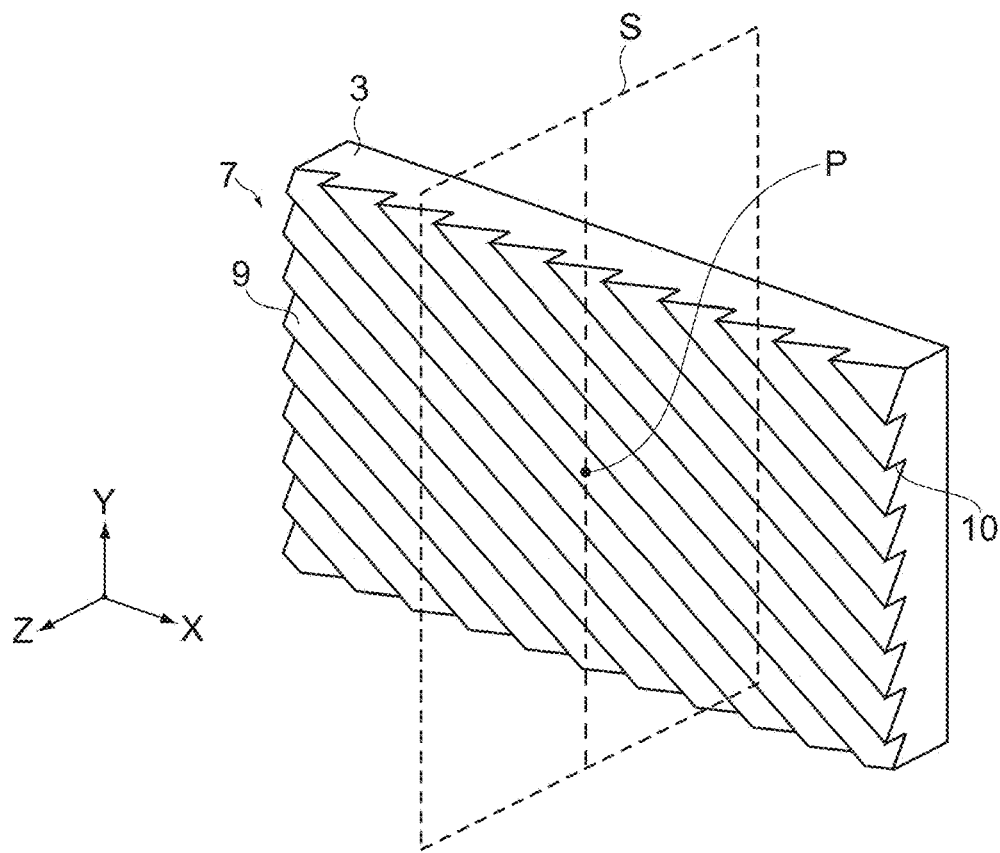
FIGS. 14A and 14B A schematic view showing a specific configuration example of the corrugated surface.
Figure 14B:
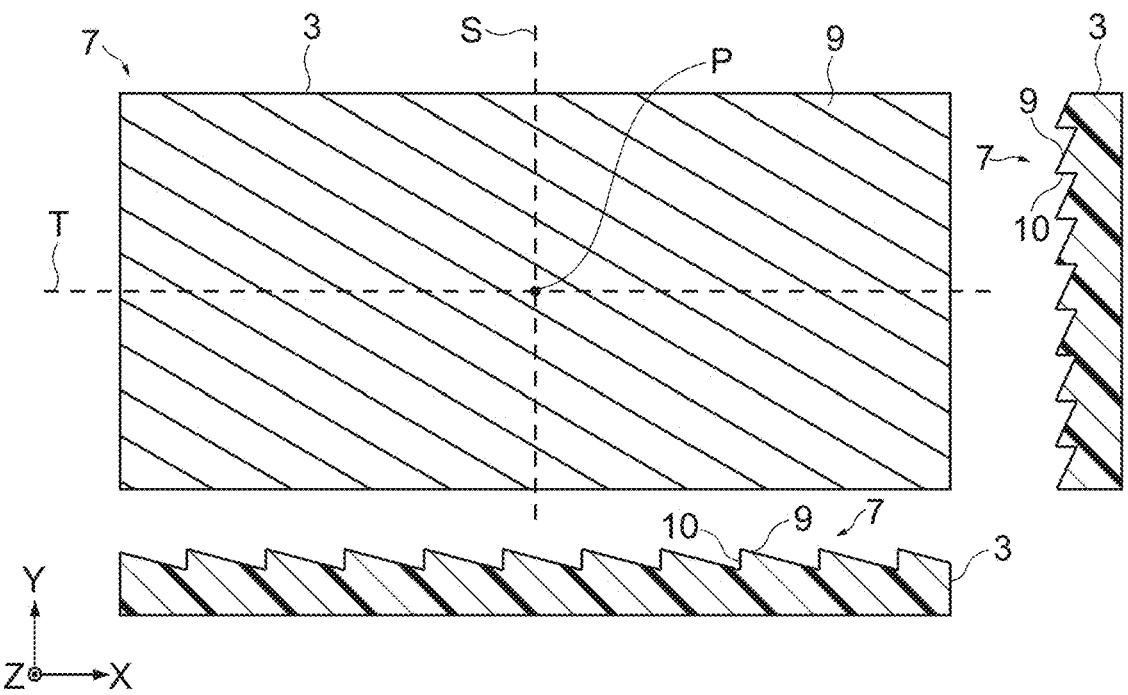
Figure 15A:
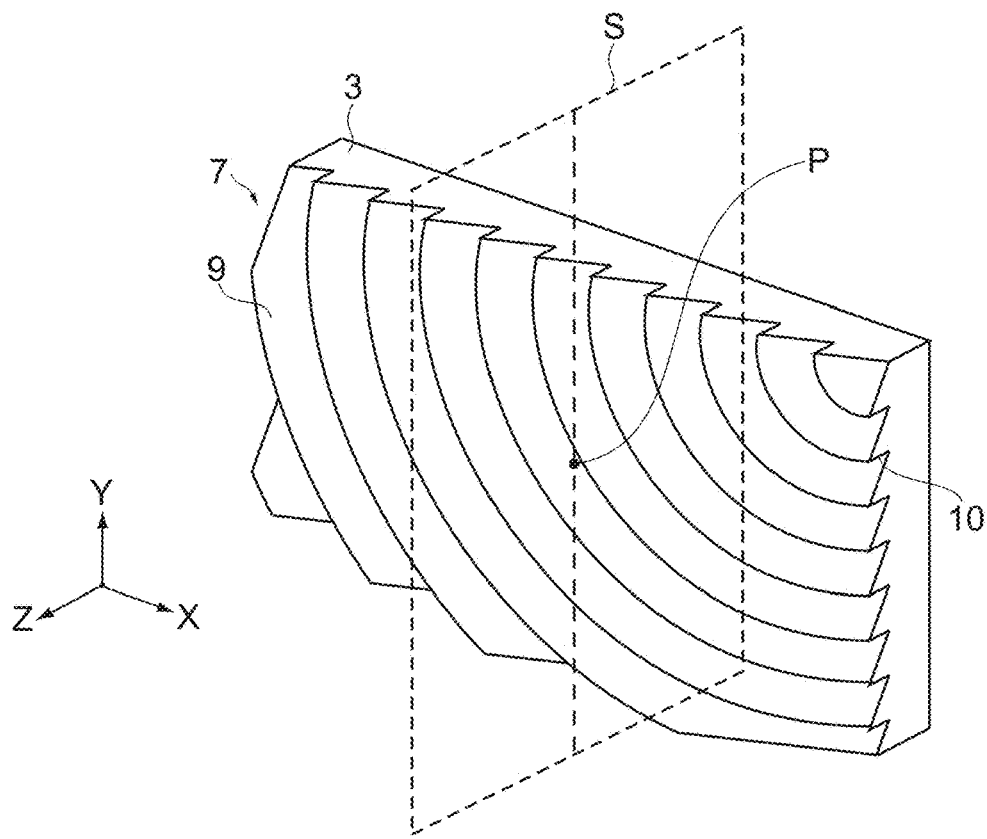
FIGS. 15A and 15B A schematic view showing a specific configuration example of the corrugated surface.
Figure 15B:
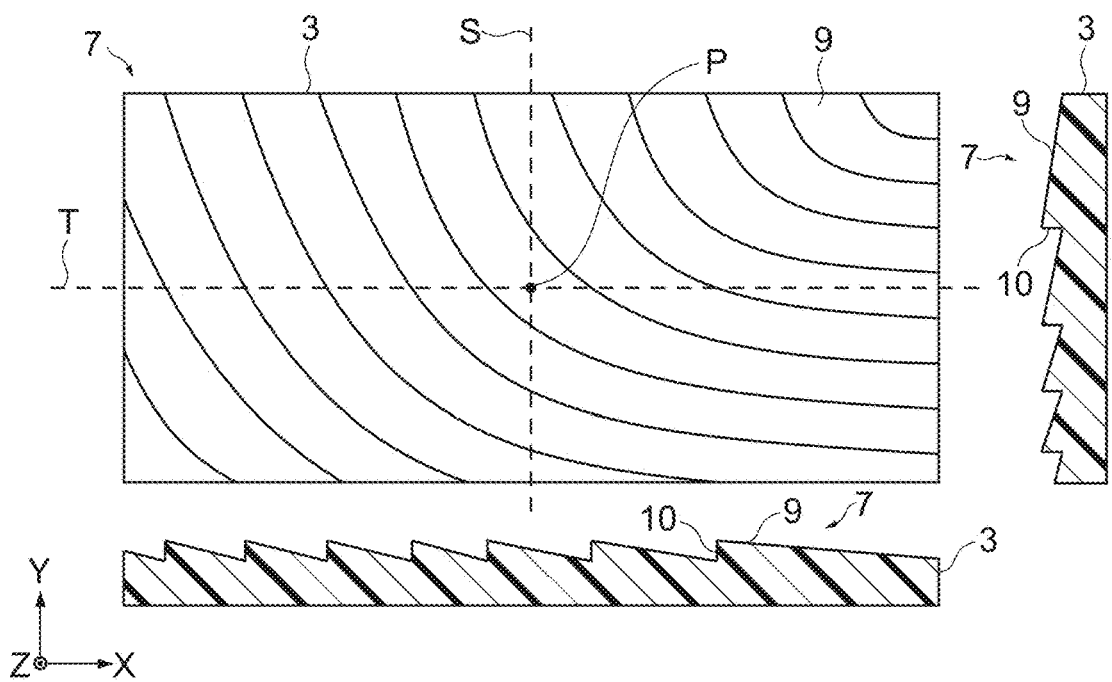

FIGS. 13B, 14B, and 15B show, in the middle, front views of the screen 3 as viewed from the front. On the right-hand side of the front views, a cross-sectional view of the screen 3 taken along the reference plane S is shown. On the lower side of the front views, a cross-sectional view of the screen 3 taken along a plane T orthogonal to the reference plane S is shown.

In the example shown in FIGS. 13A and 13B, the plurality of reflection surfaces 9 constituted by the planar shapes extending in the X direction (horizontal direction) is configured. Each reflection surface 9 is designed to be oriented upward in the Y direction (vertical direction). Moreover, the reflection surfaces 9 are configured so that the surface directions are parallel to each other.

The connection surface 10 is configured to be parallel to the XZ plane and connects the reflection surfaces 9 adjacent to each other.

The image light L1 emitted to the screen 3 is diffused and reflected upward in the vertical direction through the plurality of reflection surfaces 9. Thus, the image display direction (directional direction) of the screen 3 shown in FIGS. 13A and 13B are directions upward in the vertical direction as viewed from the screen 3.

In the example shown in FIGS. 14A and 14B, the plurality of reflection surfaces 9 extending obliquely and constituted by the planar shapes is configured as the screen 3 is viewed from the front. The corrugated surface 7 shown in FIGS. 14A and 14B has a configuration obtained by rotating rightward the corrugated surface 7 shown in FIGS. 13A and 13B around the reference point P as the center as the screen 3 is viewed from the front.

As shown in the two cross-sectional views of FIG. 14B, each reflection surface 9 is designed to be oriented upward in the Y direction (vertical direction) and rightward in the X direction (left and right-hand directions).

The plurality of reflection surfaces 9 diffuse and reflect the image light L1 emitted to the screen 3 upward in the vertical direction and rightward in the left and right-hand directions.

Therefore, as the image display direction (directional direction) of the screen 3 shown in FIGS. 14A and 14B are viewed from the screen 3, it is a direction upward in the vertical direction and leftward in the left and right-hand directions. That is, the image display direction (directional direction) of the screen 3 is a direction to the left upper side as viewed from the screen 3.

In the example shown in FIGS. 15A and 15B, the plurality of reflection surfaces 9 extending in the form of curve lines is configured as the screen 3 is viewed from the front. Specifically, the plurality of reflection surfaces 9 is configured to have curved surface shapes curved down-leftward from the right side to the upper side as the screen 3 is viewed from the front.

Each reflection surface 9 is configured to have an approximately concentric circle shape having the right upper side as the center as the screen 3 is viewed from the front.

As shown in the two cross-sectional views of FIG. 15B, each reflection surface 9 is designed to be oriented upward in the Y direction (vertical direction) and rightward in the X direction (left and right-hand directions).

The plurality of reflection surfaces 9 diffuses and reflects the image light L1 emitted to the screen 3 upward in the vertical direction and rightward in the left and right-hand directions.

Therefore, the image display direction (directional direction) of the screen 3 shown in FIGS. 15A and 15B are directions upward in the vertical direction and leftward in the left and right-hand directions as viewed from the screen 3. That is, the image display direction (directional direction) of the screen 3 is a direction up-leftward as viewed from the screen 3.

The configuration example shown in FIGS. 13A and 13B are configurations in a case where the image display direction (directional direction) is set in one dimensional direction that is the vertical direction. FIGS. 14A, 14B, 15A, and 15B show configurations in which the image display direction (directional direction) is set in two dimensional directions that are the vertical direction and the left and right-hand directions. The configuration examples as shown in FIGS. 14A, 14B, 15A, and 15B can easily achieve the configuration as shown in FIGS. 12A and 12B. Thus, the "visibility-enhancing effect" can be achieved.

[Configuration Condition for Corrugated Surface]

Characteristic configurations of the corrugated surface 7 that can be employed in the present technology will be described. As a matter of course, the configurations described below are not essential configurations for the present technology.

(Configuration A)

Each reflection surface 9 is a flat surface and is configured not to be orthogonal to the reference plane S. This (Configuration A) is employed in the configuration example shown in FIGS. 14A and 14B.

(Configuration B)

Each reflection surface 9 is a curved surface and is configured so that a tangential plane at a portion (cross line) crossing the reference plane S is not orthogonal to the reference plane S. This (Configuration B) is employed in the configuration example shown in FIGS. 15A and 15B.

Figure 16A:
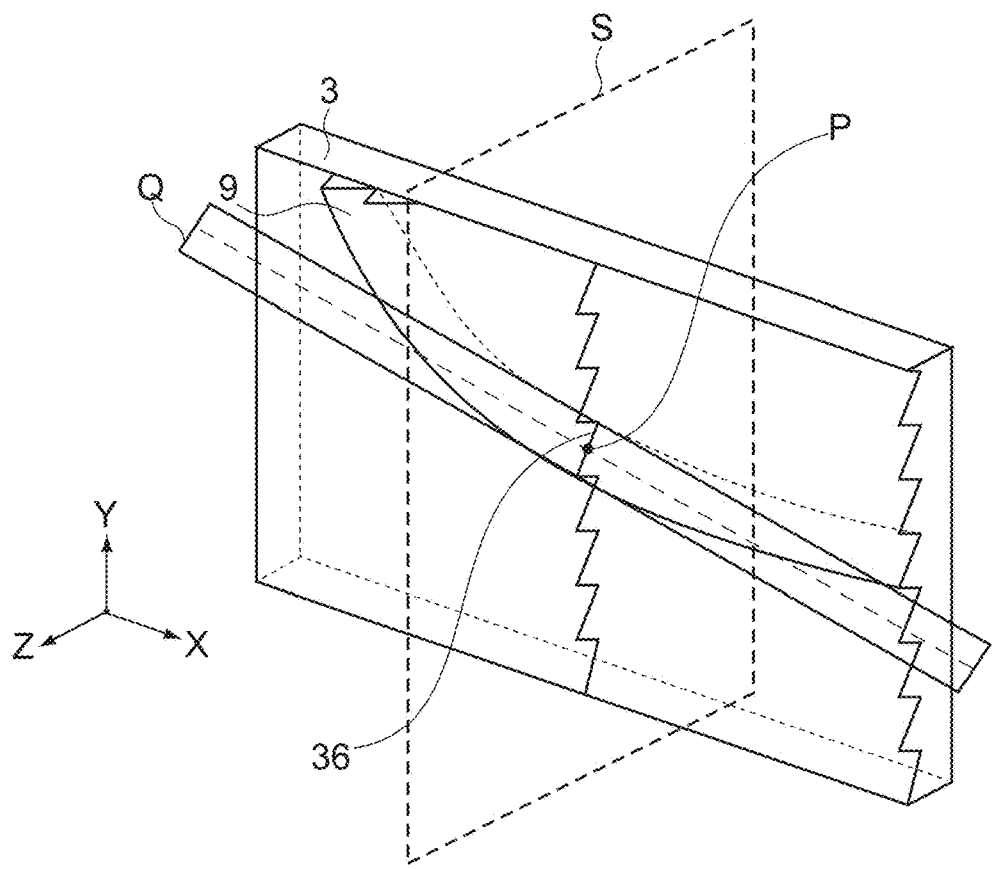
FIGS. 16A and 16B A schematic view for describing a tangential plane.
Figure 16B:
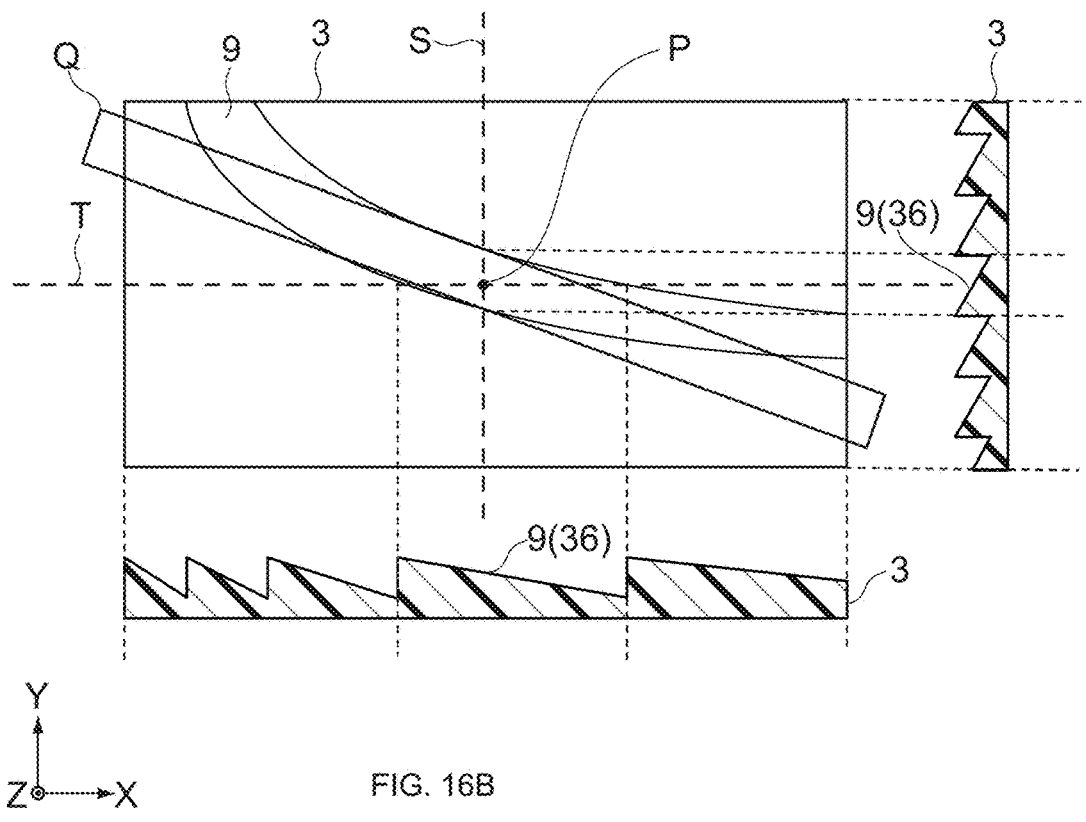

FIGS. 16A and 16B are schematic views for describing the tangential plane in (Configuration B). FIGS. 16A and 16B show only one reflection surface 9 in each view other than the cross-sectional views.

As shown in FIG. 16A, a configuration in which an angle of intersection of a tangential plane Q and the reference plane S in a portion 36 where the reflection surface 9 crosses the reference plane S in each reflection surface 9 is not a right angle is (Configuration B).

Employing (Configuration A) or (Configuration B) can easily achieve the configuration as shown in FIGS. 12A and 12B. Thus, the "visibility-enhancing effect" can be achieved.

As a matter of course, also in the configuration shown in FIGS. 13A and 13B, in a case where the assumed viewing position 34 is set on the upper side in the vertical direction, the "visibility-enhancing effect" is achieved.

(Configuration C)

The reflection surfaces 9 are each configured so that the normal line at the portion crossing the reference plane S is directed to the assumed viewing position 34. Accordingly, the "visibility-enhancing effect" is achieved.

It should be noted that the state in which the "normal line is directed to the assumed viewing position 34" is not limited to a case where the assumed viewing position 34 is positioned on the extension of the normal line. It also includes a case where the normal line is directed to an area near the assumed viewing position 34.

For example, the state in which the "normal line is directed to the assumed viewing position 34" includes a state in which the assumed viewing position 34 is included in a cone having an apex angle of 90 degrees centered at the normal line. In addition, it includes an arbitrary state in which the assumed viewing position 34 is on the front side of the displayed image (side in the normal line direction).

(Configuration D) The reflection surfaces 9 are configured so that components in a direction of a normal line at the portion crossing the reference plane S are parallel to each other, the direction being included in the reference plane S.

Figure 17:
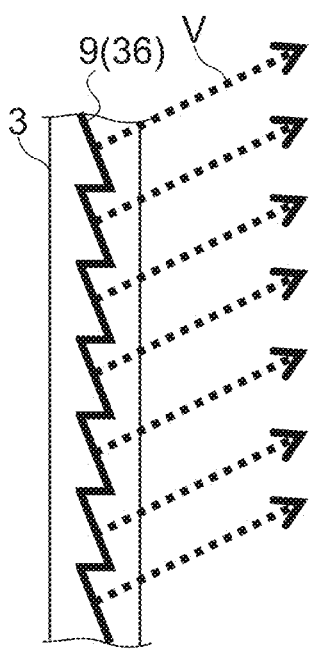
FIG. 17 A cross-sectional view of the screen taken along a reference plane S.

FIG. 17 is a cross-sectional view of the screen 3 taken along the reference plane S (hatching is omitted). The sheet of FIG. 17 corresponds to the reference plane S.

The components in the direction of the normal line, which is included in the reference plane S, at the portion 36 crossing the reference plane S are components obtained by projecting the normal line at the crossing portion 36 on the reference plane S. As shown in FIG. 17, the state in which components V in the respective reflection surfaces 9 are parallel to each other is (Configuration D).

This (Configuration D) is employed in the configuration example shown in FIGS. 13A, 13B, 14A, and 14B. It should be noted that as to the configuration shown in FIGS. 15A and 15B, it may be designed to have the configuration D.

Employing (Configuration D) can simplify the configuration of the corrugated surface 7. Thus, the corrugated surface 7 can be fabricated by a simple process at lower cost.

[Fresnel Lens Shape]

Figure 18A:
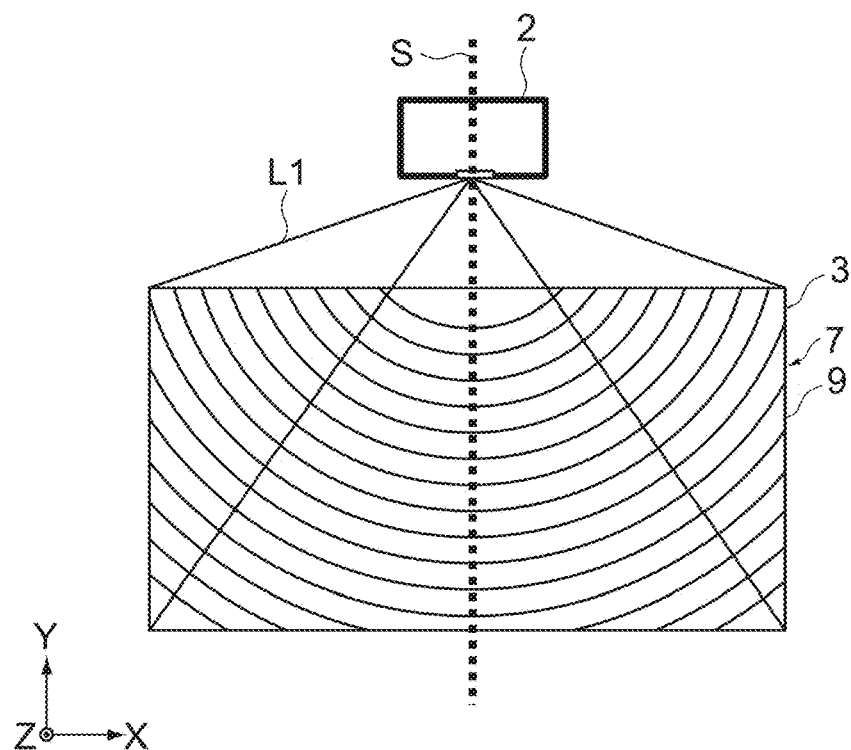
FIGS. 18A and 18B A schematic view showing another configuration example of the corrugated surface.
Figure 18B:
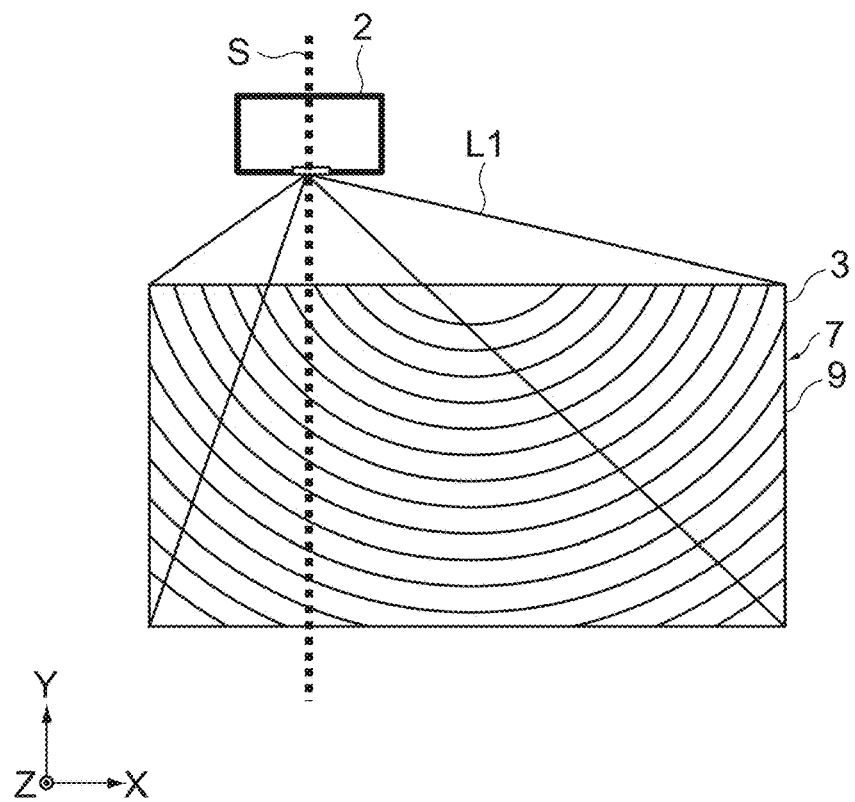

FIGS. 18A and 18B are schematic views showing another configuration example of the corrugated surface 7.

Figure 19A:
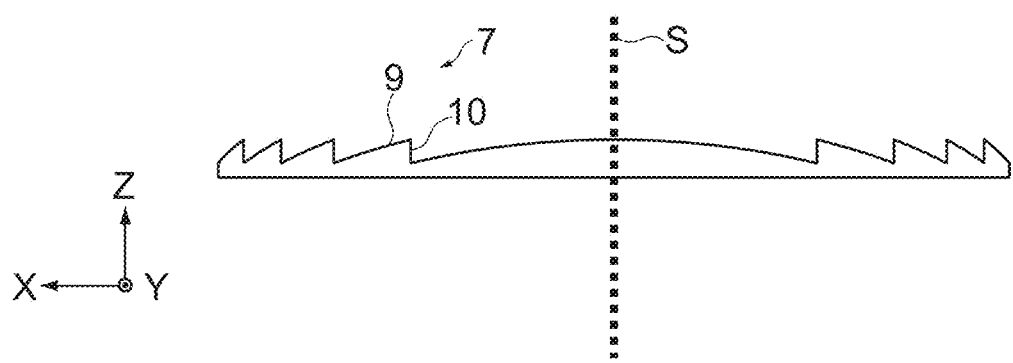
FIGS. 19A and 19B A schematic view for describing an example of a Fresnel lens shape.
Figure 19B:
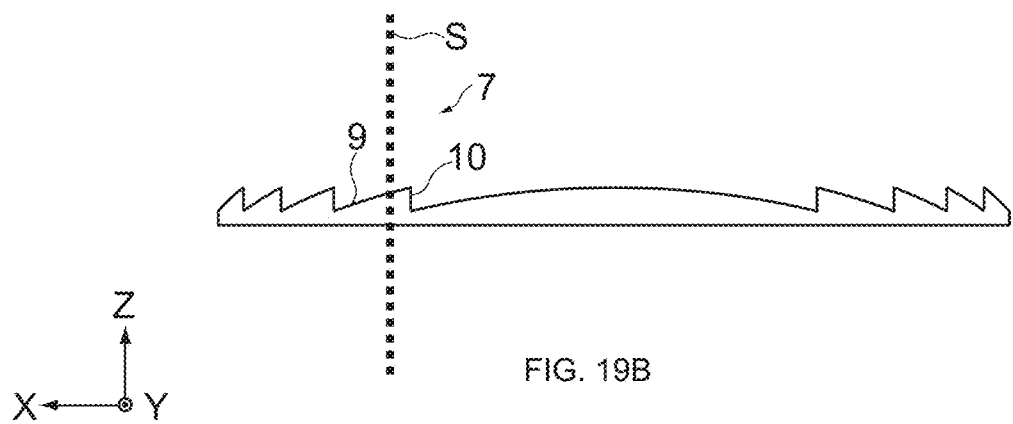

FIGS. 19A and 19B are schematic views for describing an example of a Fresnel lens shape.

FIGS. 19A and 19B are schematic views of the corrugated surface 7 shown in FIGS. 18A and 18B as viewed from the upper side in the vertical direction. It should be noted that FIGS. 19A and 19B show the plurality of reflection surfaces 9 reduced in number for the sake of easy understanding of the Fresnel lens shape.

As shown in FIGS. 18A, 18B, 19A, and 19B, the corrugated surface 7 may be configured with the Fresnel lens shapes. Surfaces corresponding to lens facets of the Fresnel lens shapes are the plurality of reflection surfaces 9. Moreover, surfaces corresponding to draft facets of the Fresnel lens shapes are the plurality of connection surfaces 10.

As illustrated in FIGS. 18A and 19A, in the configuration in which the reference plane S is positioned at the center of the Fresnel lens shape (the configuration in which the short throw projector 2 is disposed on the front), the image is displayed on the front side.

As shown in FIGS. 18B and 19B, in the configuration in which the reference plane S is shifted leftward from the center of the Fresnel lens shape (the configuration in which the short throw projector 2 is shifted leftward), the image is displayed on the right-hand side as the screen 3 is viewed from the front. Thus, the configuration as shown in FIGS. 12A and 12B can be achieved.

For example, in a case of the short throw projector 2 or the like, light rays of the image light L1 (e.g., pixel light rays respectively constituting pixels) can also have different angles of incidence. In such a case, employing the Fresnel lens shape is effective for high-quality image display.

[Application Examples to Vehicle]

The image projection system 1 according to the present technology can be mounted on the interior of a vehicle.

FIGS. 20A, 20B, 20C, 21A, 21B, and 21C are schematic views showing an example of the image projection system 1 mounted on the interior of the vehicle.

FIGS. 20A, 20B, 20C, 21A, 21B, and 21C show the interior of the vehicle, centered at the image projection system 1 and the viewer inside the vehicle.

Figure 20B:
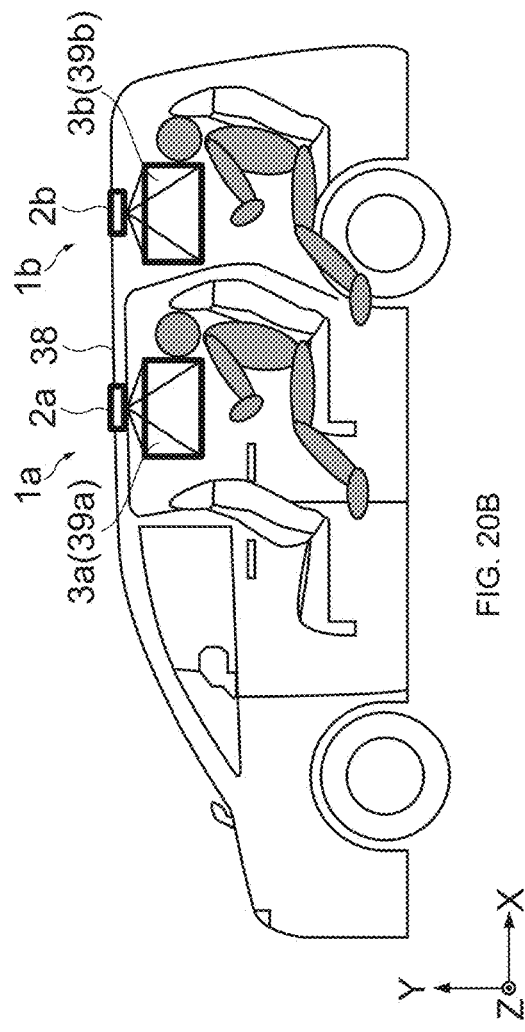
FIGS. 20A, 20B, and 20C A schematic view showing an example of an image projection system mounted on the interior of the vehicle.
Figure 20C:
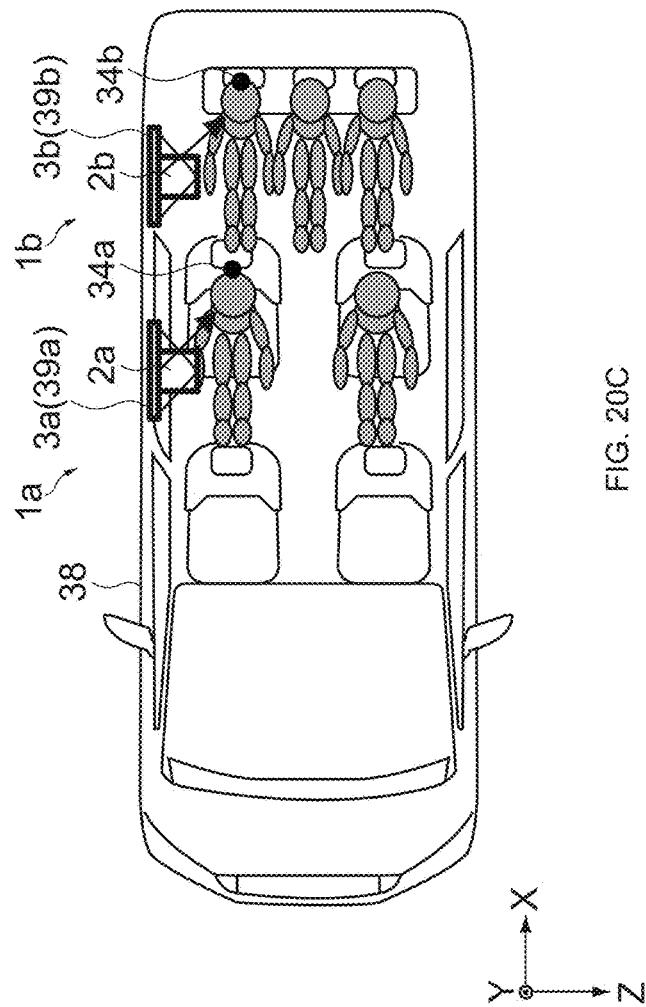
Figure 20A:
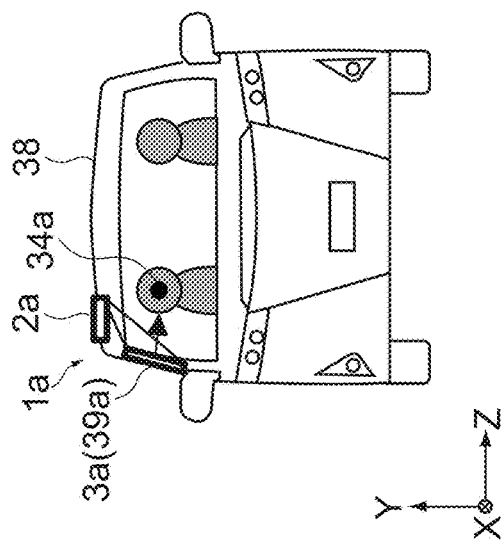
Figure 21A:
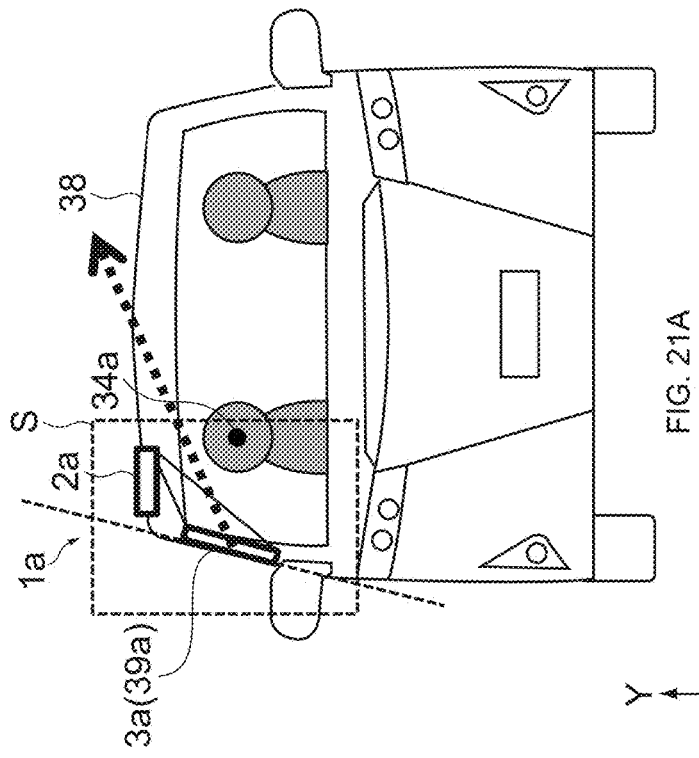
FIGS. 21A, 21B, and 21C A schematic view showing an example of the image projection system mounted on the interior of the vehicle.
Figure 21B:
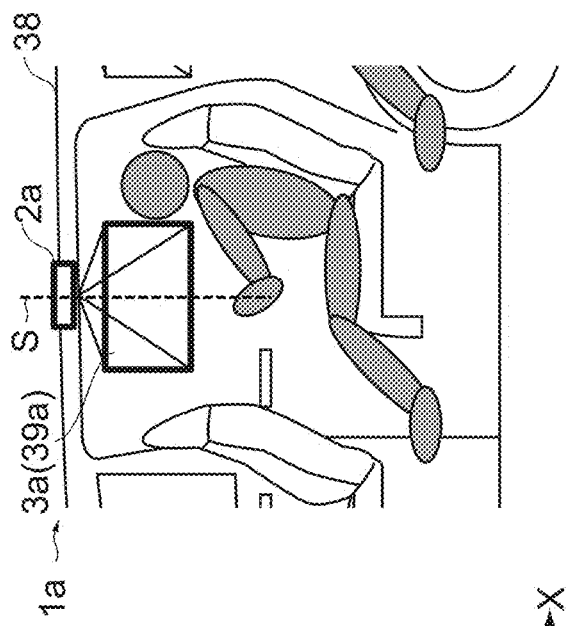
Figure 21C:
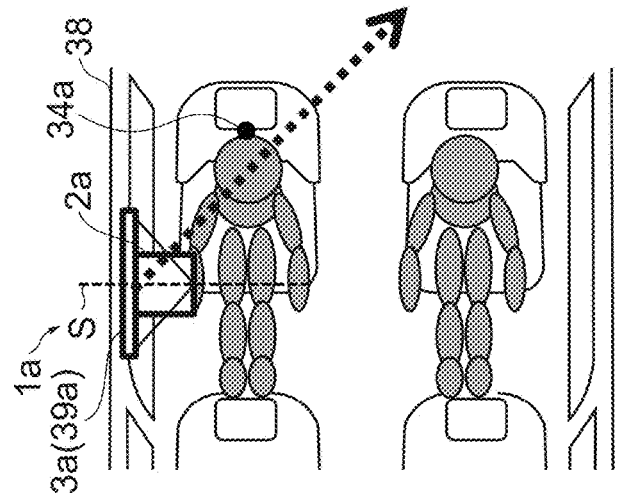

FIGS. 20A, 20B, and 20C are figures made including the entire vehicle. FIGS. 21A, 21B, and 21C are an enlarged diagram obtained by enlarging FIGS. 20A, 20B, and 20C. FIGS. 21B and 21C show a partial region inside the vehicle in an enlarged state.

FIGS. 20A and 21A are figures of the vehicle as viewed from the front side. FIGS. 20B and 21B are figures of the vehicle as viewed from the left-hand side. FIGS. 20C and 21C are figures of the vehicle as viewed from the upper side.

In the present embodiment, the screen 3 is configured in at least a partial region of a window 39 of a vehicle 38. The screen 3 may constitute the entire region of the window 39 or the screen 3 may constitute a partial region of the window 39.

Moreover, the window glass and the screen 3 may be integrally configured or the screen 3 may be attached to the window glass.

In the example shown in FIGS. 20A, 20B, 20C, 21A, 21B, and 21C, a screen 3a is installed in a window 39a of the right-hand side windows, which is located beside the second-row seats. Moreover, a screen 3b is installed in a window 39b located beside the third-row seats.

As shown in FIGS. 20A and 20B, the screens 3a and 3b are configured as plane screens and are tilted to the front side (vehicle interior) of the screens 3a and 3b. As a matter of course, a curved surface shape having a radius of curvature of approximately one hundred to several thousands as R (mm) may be employed in accordance with the shape of the window 39 of the vehicle 38 as the vehicle 38 is viewed from the front.

In the present embodiment, an assumed viewing position 34a is set at a portion of the headrest of the seat of the second-row seats, which is the closest to the window 39a. The corrugated surface 7 of the screen 3a is designed on the basis of the assumed viewing position 34a.

Moreover, an assumed viewing position 34b is set at a portion of the headrest of the seat of the third-row seats, which is the closest to the window 39b. The corrugated surface 7 of the screen 3b is designed on the basis of the assumed viewing position 34b.

It should be noted that typically, the design of the screen 3a based on the assumed viewing position 34a can also achieve a favorable viewing environment for the viewer seated on a position far from the screen 3a for the second-row seats.

For example, the assumed viewing position 34a may be set at the portion of the headrest of the seat far from the screen 3a for the second-row seats. Also in this case, a favorable viewing environment for two viewers seated on the second-row seats can be achieved.

The assumed viewing position 34a may be set by integrating the positions of the headrests of the seats of the second-row seats. For example, the assumed viewing position 34a may be set at a middle position between two headrests.

Also as to the third-row seats, the assumed viewing position 34b may be set by integrating the positions of the headrests of the seats. For example, the assumed viewing position 34b may be set at the position of a middle headrest among three headrests.

The configuration illustrated in FIG. 12A can be employed with an image projection system 1a including the screen 3a and an image projection system 1b including the screen 3b.

Using the short throw projector 2a and 2b enables emission of the image light L1 to the screen 3 while avoiding the head and body of the viewer (vehicle passenger). A favorable viewing environment can be thus achieved.

Moreover, employing as appropriate the configuration of the optical element unit 5, the polarized state of the image light L1, and (Configuration A) to (Configuration D) and the Fresnel lens shapes associated with the corrugated surface 7 described above can achieve the "leaking light-reducing effect", the "surface reflection-reducing effect", the "background light noise-reducing effect", and the "visibility-enhancing effect".

Figure 22:
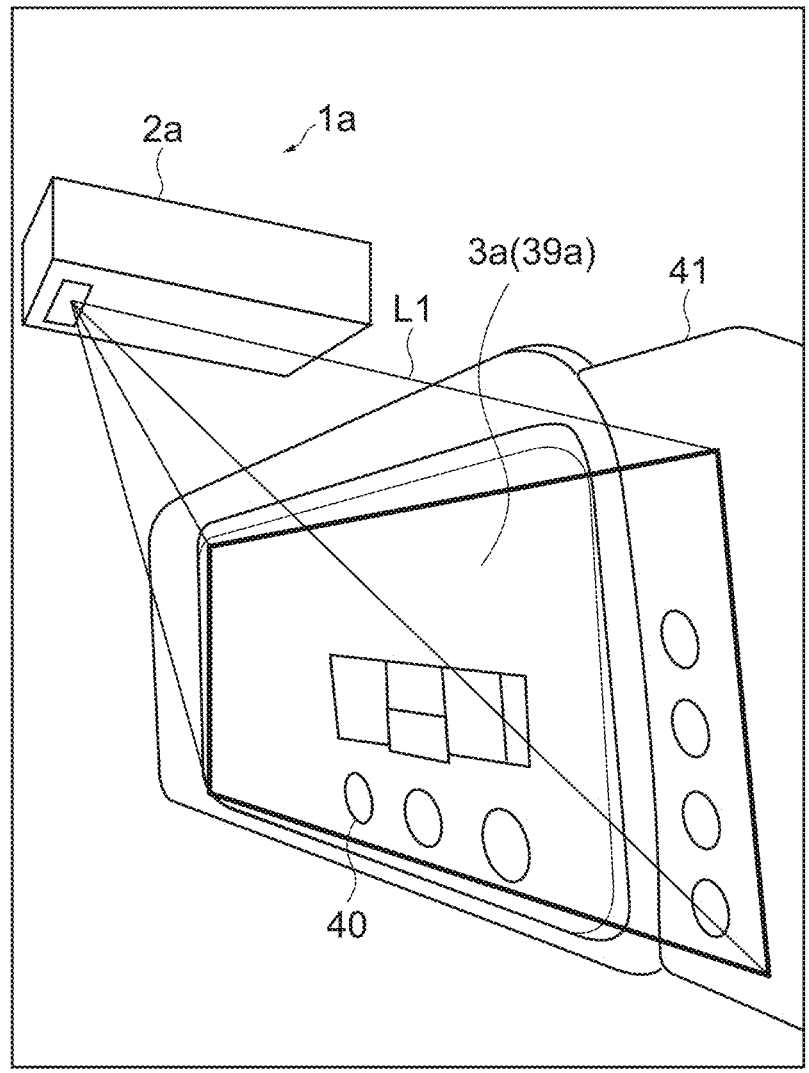
FIG. 22 A schematic view showing the image projection system inside the vehicle shown in FIGS. 20A, 20B, 20C, 21A, 21B, and 21C.

FIG. 22 is a schematic view showing the image projection system 1a inside the vehicle.

An image 40 is displayed on the window 39a from a short throw projector 2a installed on the ceiling. A favorable viewing environment for the viewer seated on the second-row seats is achieved.

For example, the "leaking light-reducing effect" prevents a hot spot from being visible to pedestrians outside the vehicle and drivers and the like of other vehicles. Moreover, since the contents of the image or like that the viewer is enjoying inside the vehicle is invisible to the pedestrians and the drivers and the like of the other vehicles, it is desirable in terms of privacy protection.

Moreover, the "surface reflection-reducing effect" can suppress projection of the unnecessary image light L1 onto the interior of the vehicle and can prevent its unwanted reflection on the windshield and front-row side windows. Consequently, it can also prevent interference with driving of the driver, and high safety is exerted.

Moreover, the "background light noise-reducing effect" can sufficiently suppress the background light noise including the X-polarized light as a major component and can sufficiently enhance the visibility of the image displayed on the screen 3a. Moreover, it enables the image output with the Y-polarized light to be properly displayed from an external display or the like. Thus, the AR application can be properly used.

Moreover, since the "visibility-enhancing effect" enables the image to be displayed to an area where the viewer is present, high visibility is exerted. The high visibility is also exerted, for example, in a case where the image light L1 is emitted to the screen 3 while avoiding the head and body of the viewer (vehicle passenger).

It should be noted that in the example shown in FIG. 22, the image light L1 is also projected onto a frame 41 supporting the edges of the window 39a (screen 3a). In this manner, the image may be displayed not only on the screen 3a but also on members around the screen 3a.

For example, GUIs or the like for switching displayed content and making an operation for the short throw projector 2 are displayed on the surrounding members, not on the screen 3a constituted by the transparent screen. This can improve the operability and the like for the viewer. As a matter of course, the present technology is not limited to such an example.

FIGS. 23A, 23B, 23C, 24A, 24B, and 24C are schematic views showing another example of the image projection system 1 mounted on the interior of the vehicle.

In the example shown in FIGS. 23A, 23B, 23C, 24A, 24B, and 24C, the screen 3 is installed near the center console between the first-row seats and the second-row seats.

For example, a partition having light transmissivity is disposed between the first-row seats and the second-row seats. The partition and the screen 3 may be integrally configured or the screen 3 may be attached to the partition.

A predetermined retaining unit may retain the screen 3 without the partition.

Figure 23B:
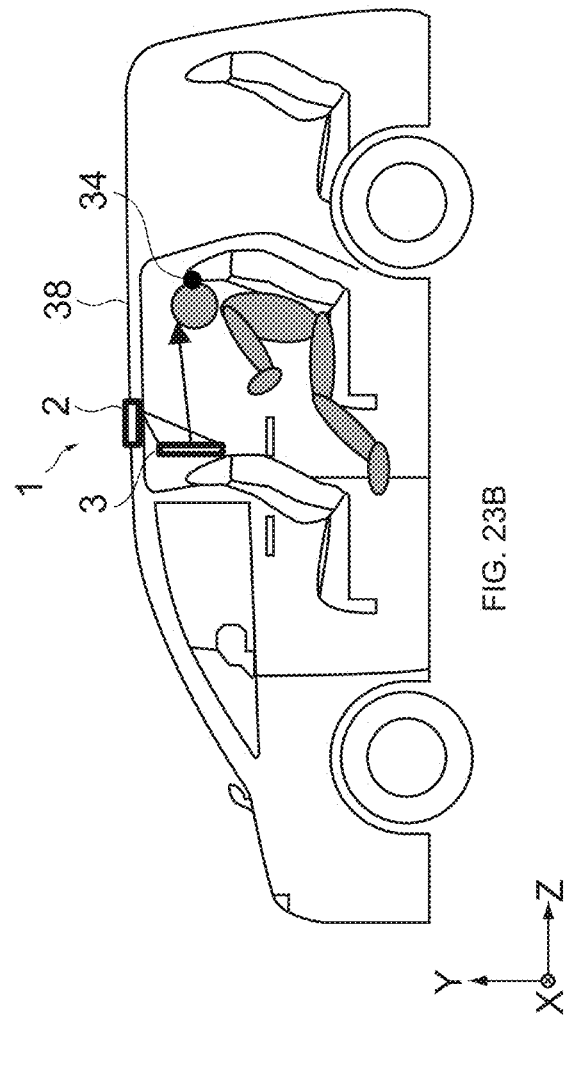
FIGS. 23A, 23B, and 23C A schematic view showing another example of the image projection system mounted on the interior of the vehicle.
Figure 23C:
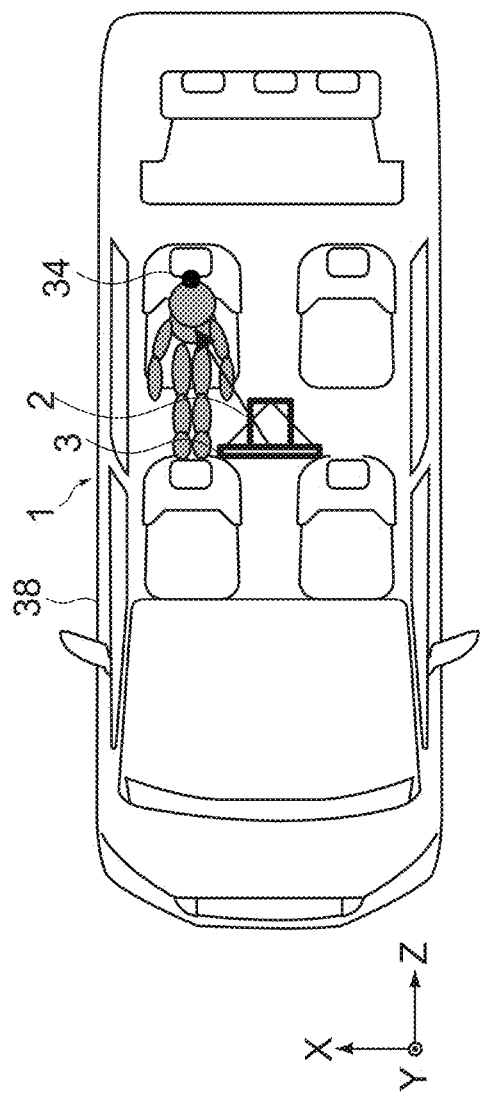
Figure 23A:
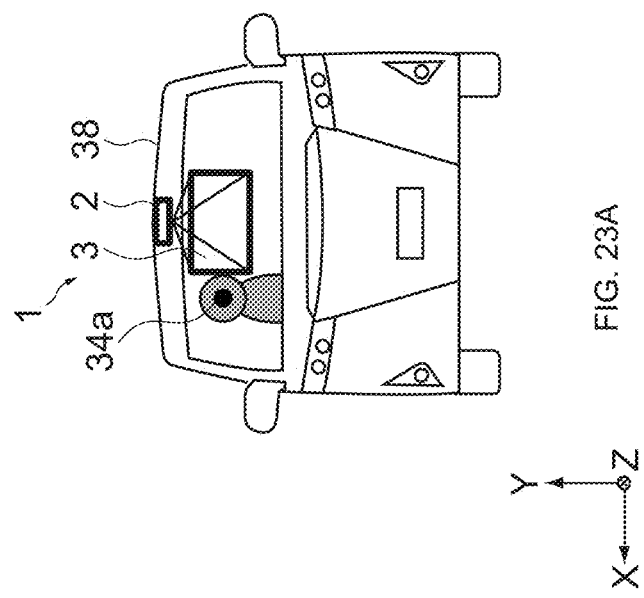
Figure 24B:
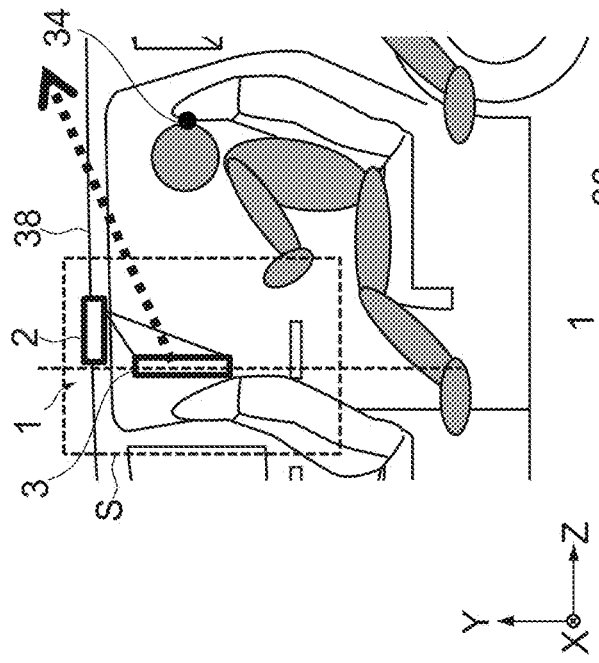
FIGS. 24A, 24B, and 24C A schematic view showing another example of the image projection system mounted on the interior of the vehicle.
Figure 24C:
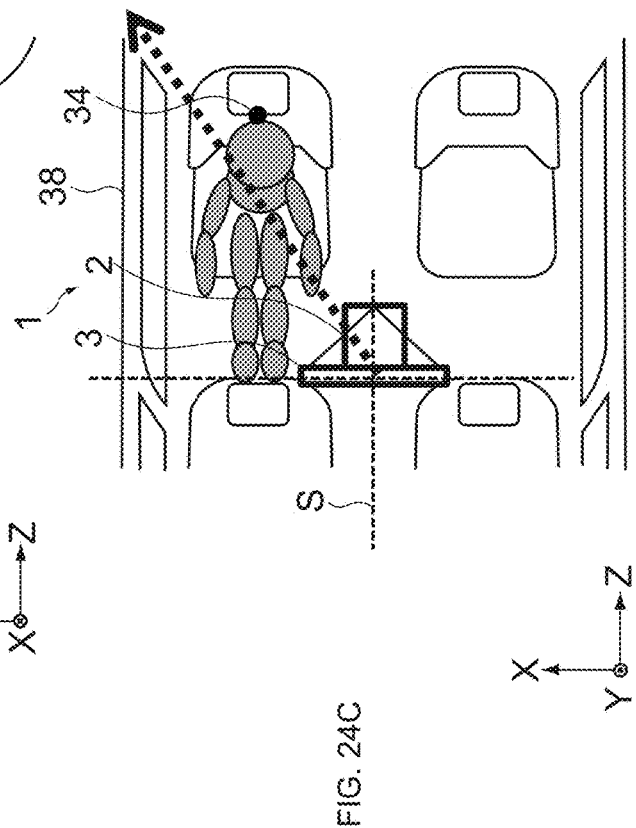
Figure 24A:
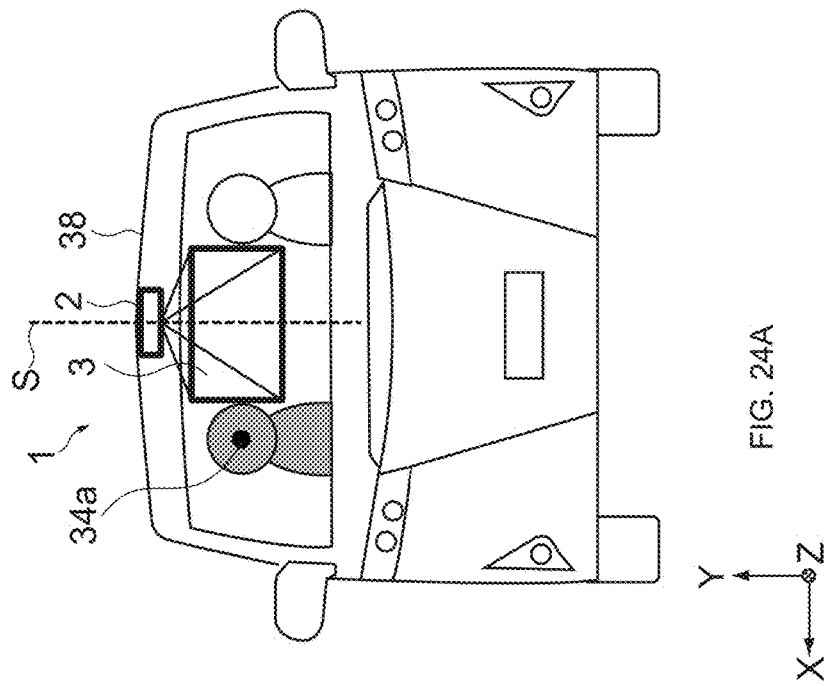

As shown in FIGS. 23A and 24B, the screens 3a and 3b are configured as plane screens and disposed in parallel with the vertical direction (Y direction).

In the present embodiment, the assumed viewing position 34 is set at the portion of the headrest of the right seat of the second-row seats. The corrugated surface 7 of the screen 3 is designed on the basis of the assumed viewing position 34.

That is, in the present embodiment, the image is displayed by setting only a person seated on the right seat of the second-row seats as the viewer.

The configuration illustrated in FIG. 12B can be employed as the image projection system 1 including the screen 3.

Using the short throw projector 2 enables emission of the image light L1 to the screen 3 while avoiding the head and body of the viewer (vehicle passenger). A favorable viewing environment can be thus achieved.

Moreover, employing as appropriate the configuration of the optical element unit 5, the polarized state of the image light L1, and (Configuration A) to (Configuration D) and the Fresnel lens shapes associated with the corrugated surface 7 described above can achieve the "leaking light-reducing effect", the "surface reflection-reducing effect", the "background light noise-reducing effect", and the "visibility-enhancing effect".

The screen 3 can be installed at any position inside the vehicle. For example, the screen 3 may be installed in the front window, the rear window, or the like.

As described above, the plurality of reflection surfaces 9 included in the corrugated surface 7 diffuse and reflect the image light L1 in the image projection system 1 and the screen 3 according to the present embodiment. This enables an image to be displayed to the viewer present on the front side.

Moreover, the optical element unit 5 restricts the backward transmission of the image light L1 and transmits part of the background light L2 entering from the back side.

This screen 3 can be thus used as the transparent screen. Moreover, backward leakage of the image light L1 can be prevented. A favorable viewing environment for the viewer is thus achieved.

In a case of configuring a screen capable of controlling the directional angle, it is conceivable to employ a structure that makes the luminance uniform in a wide angle as much as possible by widening the angle of the field of view for viewing a video in various directions. Moreover, it is also conceivable to employ a symmetric structure with respect to the angle.

With such a structure, the luminance is maximized in the front and the luminance in a direction with a large angle of incidence lowers as a result.

Moreover, in order to enhance the visibility from a limited direction like the vehicle, it is typical to employ a method of increasing the luminance of the projector. However, it imposes a limitation on an installable size because it requires cooling.

The image projection system 1 and the screen 3 according to the present embodiment can exert the various effects described above, and a favorable viewing environment to the viewer can be achieved. As a matter of course, all the various effects do not need to be exerted at the same time, and configurations that can exert the respective effects only need to be employed as appropriate.

Other Embodiments

The present technology is not limited to the above-mentioned embodiments, and various other embodiments can be made.

As to the configuration of the optical element unit 5, optical characteristics may be controlled for each region in accordance with the angle of incidence (incident position) of the image light L1. For example, the absorption axis direction may be controlled for each region as the polarizing plate 27 is viewed from the front. That is, a distribution of the absorption axis of the polarizing plate 27 may be controlled as appropriate in accordance with the angle of incidence (incident position) of the image light L1.

Also in a case of the phase difference plate (half-wave plate, quarter wave plate, any other wave plate applying a predetermined phase difference), optical characteristics may be controlled for each region in accordance with the distribution of the absorption axis.

For example, fields, devices, and the like to which the image projection system and the screen according to the present technology can be applied are not limited. The image projection system and the screen according to the present technology can be applied to any field and any device.

For example, the present technology can be applied to any movable object such as an automobile, an electric automobile, a hybrid electric automobile, a motorcycle, a bicycle, a personal transporter, an airplane, a drone, a watercraft, a robot, a construction machinery, and an agricultural machinery (tractor).

As a matter of course, the present technology is not limited to the movable object, and the present technology can be applied to any electronic apparatus, e.g., an electronic apparatus such as a portable phone, a smartphone, a personal computer, a game console, a digital camera, an audio apparatus, a TV, a projector, a car navigation system, a GPS terminal, a wearable information apparatus (eyeglasses-type, wristband-type), or an IoT apparatus connected to the Internet or the like.

Moreover, the image projection system and the screen according to the present technology may be used in any place where the transparent screen is used, e.g., any facility such as a control room, a library, and shop window.

The configurations, the processing flows, and the like such as the image projection system, the screen, the corrugated surface, the optical element unit, the image projection apparatus, the short throw projector, and the vehicle described above with reference to the drawings are merely embodiments, and can be arbitrarily modified without departing from the gist of the present technology. That is, any other configurations, algorithms, and the like for carrying out the present technology may be employed.

In the present disclosure, for the sake of easy understanding, the wordings, "substantially", "almost", and "about" are used as appropriate. However, no clear difference is defined between a case with the wordings, "substantially", "almost", and "about" and a case without these wordings.

That is, in the present disclosure, it is assumed that the concepts that define the shape, the size, the position relationship, the state, and the like such as "center", "middle", "uniform", "equal", the "same", "orthogonal", "parallel", "symmetric", "extending", "axial", "columnar", "cylindrical", "ring-shaped", and "annular" are concepts including "substantially center", "substantially middle", "substantially uniform", "substantially equal", "substantially the same", "substantially orthogonal", "substantially parallel", "substantially symmetric", "substantially extending", "substantially axial", "substantially columnar", "substantially cylindrical", "substantially ring-shaped", "substantially annular", and the like.

For example, states included in a predetermined range (e.g., ±10% range) using "completely center", "completely middle", "completely uniform", "completely equal", "completely the same", "completely orthogonal", "completely parallel", "completely symmetric", "completely extending", "completely axial", "completely columnar", "completely cylindrical", "completely ring-shaped", "completely annular", and the like as the bases are also included.

Therefore, also a case where no wordings, "substantially", "almost", and "about" are added can include concepts that can be expressed by adding so-called "substantially", "almost", "about", and the like. On the contrary, states expressed with "substantially", "almost", "about", and the like does not necessarily exclude complete states.

In the present disclosure, the comparative expressions, e.g., "larger than A" or "smaller than A" are expressions encompassing both a concept including a case where it is equal to A and a concept not including a case where it is equal to A. For example, "larger than A" is not limited to the case where not including "equal to A", and also includes "A or more". Moreover, "smaller than A" is not limited to "less than A", and also includes "A or less".

For carrying out the present technology, specific settings and the like only need to be employed as appropriate on the basis of the concepts included in "larger than A" and "smaller than A" so as to provide the above-mentioned effects.

At least two of the features according to the present technology, which have been described above, may be combined. That is, the various features described in the respective embodiments may be arbitrarily combined across the respective embodiments. Moreover, the above-mentioned various effects are merely exemplary and not limitative, and other effects may be provided.

It should be noted that the present technology can also take the following configurations.

(1) A screen that is a screen that displays an image in accordance with emission of image light including light in a predetermined polarized state as a major component, including:

a corrugated surface including a plurality of reflection surfaces, the plurality of reflection surfaces having light transmissivity and diffusing and reflecting the emitted image light; and an optical element unit that is configured in accordance with a polarized state of the image light on a second side opposite to a first side of the corrugated surface on which the image light is emitted, restricts transmission of the image light to the second side, and transmits at least part of light entering from the second side.

(2) The screen according to (1) that displays the image in accordance with emission of the image light including linearly polarized light, circularly polarized light, or elliptically polarized light as a major component.

(3) The screen according to (1) or (2), in which
the optical element unit has a polarizing plate with a direction of a light shielding axis defined to be a predetermined direction.

(4) The screen according to (3), in which
the polarizing plate has the direction of the light shielding axis defined using a vertical direction as a reference.

(5) The screen according to (4), in which
provided that a plane including a normal line at a predetermined reference point on the screen and a vertical direction is a reference plane,
the direction of the light shielding axis of the polarizing plate is set to be a direction orthogonal to the normal line and parallel to the reference plane.

(6) The screen according to (5) that displays the image in accordance with emission of the image light including linearly polarized light having the reference plane as an oscillation plane as a major component.

(7) The screen according to any one of (3) to (6), in which
provided that the polarizing plate is a first polarizing plate,
the optical element unit includes
a quarter wave plate that is disposed on the second side of the first polarizing plate and converts a linearly polarized light having a direction of a light shielding axis of the first polarizing plate as a polarization direction into circularly polarized light, and
a second polarizing plate that is disposed on the second side of the quarter wave plate and having a direction of a light shielding axis orthogonal to the direction of the light shielding axis of the first polarizing plate.

(8) The screen according to any one of (3) to (6), in which
the optical element unit has a half-wave plate that is disposed on the second side of the polarizing plate and converts linearly polarized light having the direction of the light shielding axis of the polarizing plate as a polarization direction into linearly polarized light having a direction orthogonal to the direction of the light shielding axis of the polarizing plate as a polarization direction.

(9) The screen according to (5) that displays the image in accordance with emission of the image light including elliptically polarized light having a major axis direction parallel to the reference plane as a major component.

(10) The screen according to (3) or (4) that displays the image in accordance with emission of the image light including circularly polarized light as a major component, in which
the optical element unit has a quarter wave plate that is disposed on the first side of the polarizing plate and converts circularly polarized light into linearly polarized light having the direction of the light shielding axis of the polarizing plate as a polarization direction.

(11) The screen according to (3) or (4) that displays the image in accordance with emission of the image light including elliptically polarized light as a major component, in which the optical element unit has a phase difference plate that is disposed on the first side of the polarizing plate and converts elliptically polarized light into linearly polarized light having the direction of the light shielding axis of the polarizing plate as a polarization direction.

(12) The screen according to (10) or (11), in which provided that a plane including a normal line at a predetermined reference point on the screen and a vertical direction is a reference plane, the direction of the light shielding axis of the polarizing plate is set as a direction parallel to the normal line of the reference plane.

(13) The screen according to (5) or (12), in which the predetermined reference point on the screen is a point crossing an optical axis of the image light.

(14) The screen according to any one of (1) to (13), in which the plurality of reflection surfaces is constituted by a material having light transmissivity and is configured as a rough surface.

(15) The screen according to any one of (1) to (14), in which the plurality of reflection surfaces is configured by disposing a light-diffusing material on a surface constituted by a material having light transmissivity.

(16) The screen according to any one of (1) to (15), in which provided that a plane including a normal line at a predetermined reference point on the screen and a vertical direction is a reference plane, each of the plurality of reflection surfaces is a plane and is configured not to be orthogonal to the reference plane.

(17) The screen according to any one of (1) to (16), in which provided that a plane including a normal line at a predetermined reference point on the screen and a vertical direction is a reference plane, each of the plurality of reflection surfaces is a curved surface and is configured so that a tangential plane at a portion crossing the reference plane is not orthogonal to the reference plane.

(18) An image projection system, including:

an image projection apparatus that emits image light including light in a predetermined polarized state as a major component; and a screen including a corrugated surface including a plurality of reflection surfaces, the plurality of reflection surfaces having light transmissivity and diffusing and reflecting the emitted image light, and an optical element unit that is configured in accordance with a polarized state of the image light on a second side opposite to a first side of the corrugated surface on which the image light is emitted, restricts transmission of the image light to the second side, and transmits at least part of light entering from the second side.

(19) A vehicle, including:

an image projection apparatus that emits image light including light in a predetermined polarized state as a major component; and a screen including a corrugated surface including a plurality of reflection surfaces, the plurality of reflection surfaces having light transmissivity and diffusing and reflecting the emitted image light, and an optical element unit that is configured in accordance with a polarized state of the image light on a second side opposite to a first side of the corrugated surface on which the image light is emitted, restricts transmission of the image light to the second side, and transmits at least part of light entering from the second side.

(20) The vehicle according to (19), further including a window, in which the screen is configured to be at least a partial region of the window.

(21) The screen according to (3), in which the polarizing plate is an absorptive polarizer, and the light shielding axis is an absorption axis.

(22) The screen according to (3), in which the polarizing plate is a reflective polarizer, and the light shielding axis is a reflection axis.

(23) The screen according to any one of (1) to (22) that displays the image in accordance with emission of the image light from a short throw projector.

(24) The screen according to any one of (1) to (23), in which the plurality of reflection surfaces is each configured to be oriented in accordance with a predetermined image display direction.

(25) The screen according to any one of (1) to (24), in which provided that a plane including a normal line at a predetermined reference point on the screen and a vertical direction is a reference plane, an assumed viewing position that is assumed to be a position for viewing the image is configured to depart from the reference plane.

(26) The screen according to any one of (1) to (25), in which provided that a plane including a normal line at a predetermined reference point on the screen and a vertical direction is a reference plane, the plurality of reflection surfaces is each configured so that a normal line at a portion crossing the reference plane is directed to the assumed viewing position.

(27) The screen according to any one of (1) to (26), in which provided that a plane including a normal line at a predetermined reference point on the screen and a vertical direction is a reference plane, the plurality of reflection surfaces is configured so that components in a direction of a normal line at a portion crossing the reference plane are parallel to each other, the direction being included in the reference plane.

(28) The screen according to any one of (1) to (27), in which the corrugated surface includes a plurality of connection surfaces connecting adjacent reflection surfaces of the plurality of reflection surfaces.

(29) The screen according to any one of (1) to (28), in which
provided that a plane including a normal line at a predetermined reference point on the screen and a vertical direction is a reference plane,
the screen has a surface orthogonal to the reference plane.

REFERENCE SIGNS LIST

L1 image light
L2 background light
O optical axis
S reference surface
1 image projection system
2 short throw projector (image projection apparatus)
3 screen
4 screen unit
5 optical element unit
7 corrugated surface
9 reflection surface
10 connection surface
25 light-diffusing material
27 polarizing plate (first polarizing plate)
28 quarter wave plate
29 polarizing plate (second polarizing plate)
30 half-wave plate
31 phase difference plate
34 assumed viewing position
38 vehicle
39 window

The invention claimed is:
1. A screen, comprising:
a corrugated surface including a plurality of reflection surfaces, wherein
an image projection apparatus emits image light on a first side of the screen;
the screen is configured to display an image based on the emitted image light,
the emitted image light includes light in a specific polarized stated as a major component,
the corrugated surface is on the first side of the screen,
the plurality of reflection surfaces have light transmissivity, and
each of the plurality of reflection surfaces diffuses and reflects the emitted image light; and
an optical element unit that has a configuration based on the specific polarized state of the emitted image light, wherein
the optical element unit is on a second side of the screen,
the second side is opposite to the first side,
the optical element unit is configured to:
restrict transmission of the emitted image light to the second side; and
transmit, to the first side, at least part of specific light that enters from the second side, and
the optical element unit includes:
a first polarizing plate that has a first direction of a light shielding axis;
a quarter wave plate on the first polarizing plate in a direction of the second side, wherein
the quarter wave plate is configured to convert linearly polarized light to circularly polarized light, and
the linearly polarized light has the first direction as a polarization direction; and
a second polarizing plate on the quarter wave plate in the direction of the second side, wherein
the second polarization plate has a second direction of a light shielding axis, and
the first direction is orthogonal to the second direction.

2. The screen according to claim 1, wherein the emitted image light includes one of the linearly polarized light, the circularly polarized light, or elliptically polarized light as the major component.

3. The screen according to claim 1, wherein the first polarizing plate has the first direction of the light shielding axis defined using-based on a vertical direction as a reference.

4. The screen according to claim 3, wherein
a plane including the vertical direction and a normal line at a specific reference point on the screen corresponds to a reference plane, and
the first direction is direction orthogonal to the normal line and parallel to the reference plane.

5. The screen according to claim 4, wherein
the emitted image light includes the linearly polarized light as the major component, and
the linearly polarized light have the reference plane as an oscillation plane.

6. The screen according to claim 4, wherein
the emitted image light includes elliptically polarized light as the major component, and
the elliptically polarized light have a major axis direction parallel to the reference plane as a major component.

7. The screen according to claim 4, wherein the specific reference point on the screen is a point that crosses an optical axis of the emitted image light.

8. The screen according to claim 1, wherein the emitted image light includes the circularly polarized light as the major component.

9. The screen according to claim 8, wherein
a plane including a vertical direction and a normal line at a specific reference point on the screen corresponds to a reference plane, and
the first direction is parallel to the normal line of the reference plane.

10. The screen according to claim 1, wherein
the emitted image light includes elliptically polarized light as the major component,
the optical element unit further includes a phase difference plate on the first polarizing plate in a direction of the first side, and
the phase difference plate is configured to convert the elliptically polarized light to the linearly polarized light.

11. The screen according to claim 1, wherein
the plurality of reflection surfaces includes a material having the light transmissivity, and
each of the plurality of reflection surfaces is a rough surface.

12. The screen according to claim 1, further comprising a light-diffusing material, wherein
the light-diffusing material is on the plurality of reflection surfaces, and
the plurality of reflection surfaces includes a material having the light transmissivity.

13. The screen according to claim 1, wherein
a plane including a vertical direction and a normal line at a specific reference point on the screen corresponds to a reference plane, and each of the plurality of reflection surfaces is non-orthogonal to the reference plane.

14. The screen according to claim 1, wherein
a plane including a vertical direction and a normal line at a specific reference point on the screen corresponds to a reference plane,
each of the plurality of reflection surfaces is a curved surface, and
a tangential plane of the curved surface at a portion crossing the reference plane is non-orthogonal to the reference plane.

15. An image projection system, comprising:
an image projection apparatus configured to emit image light of a first side of a screen, wherein the emitted image light includes light in a specific polarized state as a major component; and
the screen including:
  a corrugated surface including a plurality of reflection surfaces, wherein
    the plurality of reflection surfaces have light transmissivity, and
    each of the plurality of reflection surfaces diffuses and reflects the emitted image light; and
  an optical element unit that has a configuration based on the specific polarized state of the emitted image light, wherein
    the optical element unit is on a second side of the screen,
    the second side is opposite to the first side,
    the optical element unit is configured to:
      restrict transmission of the emitted image light to the second side; and
      transmit, to the first side, at least part of specific light that enters from the second side, and
    the optical element unit includes:
      a first polarizing plate that has a first direction of a light shielding axis;
      a quarter wave plate on the first polarizing plate in a direction of the second side, wherein
        the quarter wave plate is configured to convert linearly polarized light to circularly polarized light, and
        the linearly polarized light has the first direction as a polarization direction; and
      a second polarizing plate on the quarter wave plate in the direction of the second side, wherein
        the second polarization plate has a second direction of a light shielding axis, and
        the first direction is orthogonal to the second direction.

16. A vehicle, comprising:
an image projection apparatus configured to emit image light of a first side of a screen, wherein the emitted image light includes light in a specific polarized state as a major component; and
the screen including:
  a corrugated surface including a plurality of reflection surfaces, wherein
    the plurality of reflection surfaces have light transmissivity, and
    each of the plurality of reflection surfaces diffuses and reflects the emitted image light; and
  an optical element unit that has a configuration based on the specific polarized state of the emitted image light, wherein
    the optical element unit is on a second side of the screen,
    the second side is opposite to the first side,
    the optical element unit is configured to:
      restrict transmission of the emitted image light to the second side; and
      transmit, to the first side, at least part of specific light that enters from the second side, and
    the optical element unit includes:
      a first polarizing plate that has a first direction of a light shielding axis;
      a quarter wave plate on the first polarizing plate in a direction of the second side, wherein
        the quarter wave plate is configured to convert linearly polarized light to circularly polarized light, and
        the linearly polarized light has the first direction as a polarization direction; and
      a second polarizing plate on the quarter wave plate in the direction of the second side, wherein
        the second polarization plate has a second direction of a light shielding axis, and
        the first direction is orthogonal to the second direction.

17. The vehicle according to claim 16, further comprising a window, wherein the screen is at least a partial region of the window.

* * * * *